US012762119B2

(12) United States Patent
Subramanian et al.

(10) Patent No.: US 12,762,119 B2
(45) Date of Patent: Oct. 13, 2026

(54) SYSTEM AND METHOD OF SELECTIVE FINE-TUNING FOR CUSTOM TRAINING OF A NATURAL LANGUAGE TO LOGICAL FORM MODEL

(71) Applicant: Oracle International Corporation, Redwood Shores, CA (US)

(72) Inventors: Shivashankar Subramanian, Melbourne (AU); Gioacchino Tangari, Sydney (AU); Thanh Tien Vu, Brisbane (AU); Cong Duy Vu Hoang, Melbourne (AU); Poorya Zaremoodi, Melbourne (AU); Dalu Guo, Sydney (AU); Mark Edward Johnson, Sydney (AU); Thanh Long Duong, Melbourne (AU)

(73) Assignee: Oracle International Corporation, Redwood Shores, CA (US)

( * ) Notice: Subject to any disclaimer, the term of this patent is extended or adjusted under 35 U.S.C. 154(b) by 433 days.

(21) Appl. No.: 18/236,192

(22) Filed: Aug. 21, 2023

(65) Prior Publication Data

US 2024/0061835 A1 Feb. 22, 2024

Related U.S. Application Data

(60) Provisional application No. 63/400,016, filed on Aug. 22, 2022.

(51) Int. Cl.

| | |
|---|---|
| ***G06F 17/27*** | (2006.01) |
| ***G06F 16/2452*** | (2019.01) |
| ***G06F 16/25*** | (2019.01) |

(52) U.S. Cl.

CPC ...... *G06F 16/24522* (2019.01); *G06F 16/252* (2019.01)

(58) Field of Classification Search

CPC ........ G06F 16/00; G06F 16/24; G06F 16/245; G06F 16/24522; G06F 16/2452;

(Continued)

(56) References Cited

U.S. PATENT DOCUMENTS

| | | | | |
|---|---|---|---|---|
| 11,769,491 B1 * | 9/2023 | Bafna | .................. | G06N 3/0442 704/231 |
| 12,199,643 B1 * | 1/2025 | Li | .......................... | G06N 3/084 |

(Continued)

FOREIGN PATENT DOCUMENTS

| | | | | |
|---|---|---|---|---|
| CN | 112559556 B | | 5/2021 | |
| GB | 2632187 A | * | 1/2025 | ............. G06N 3/084 |

OTHER PUBLICATIONS

Ben-Zaken et al., "BitFit: Simple Parameter-Efficient Fine-Tuning for Transformer-Based Masked Language-Models", Available Online at: https://arxiv.org/pdf/2106.10199.pdf, Sep. 5, 2022, 9 pages.

(Continued)

*Primary Examiner* — Michael Ortiz-Sanchez
(74) *Attorney, Agent, or Firm* — Kilpatrick Townsend & Stockton LLP

(57) ABSTRACT

Systems and methods fine-tune a pretrained machine learning model. For a model having multiple layers, an initial set of configurations is identified, each configuration establishing layers to be frozen and layers to be fine-tuned. A configuration that is optimized with respect to one or more parameters is selected, establishing a set of fine-tuning layers and a set of frozen layers. An input for the model is provided to a remote system. An output of the set of frozen layers of the model, given the provided input, is received back and locally stored. The set of fine-tuning layers of the model is loaded from the remote system. The model is fine-tuned by retrieving the locally stored output of the set (Continued)

of frozen layers, and updating weights associated with the set of fine-tuning layers of the machine learning model.

20 Claims, 13 Drawing Sheets

(58) Field of Classification Search
CPC ............... G06F 16/252; G06F 16/3329; G06F 16/9535; G06F 16/953; G06F 16/243; G06F 16/334; G06F 18/214; G06F 16/2457; G06F 18/285; G06F 16/3331; G06N 20/00; G06N 3/09; G06N 3/02; G06N 3/0895; G06N 3/042; G06N 5/022; G06N 3/0455; G06N 3/044; G06N 3/091; G06N 5/01
See application file for complete search history.

(56) References Cited

U.S. PATENT DOCUMENTS

| | | | | |
|---|---|---|---|---|
| 2020/0327884 | A1* | 10/2020 | Bui | G10L 15/16 |
| 2022/0129450 | A1 | 4/2022 | Cao et al. | |
| 2023/0115321 | A1* | 4/2023 | Vu | G06N 3/084 704/232 |
| 2024/0020486 | A1* | 1/2024 | Yang | G06N 3/0495 |

OTHER PUBLICATIONS

He et al., "DeBERTaV3: Improving DeBERTa Using ELECTRA-Style Pre-Training with Gradient-Disentangled Embedding Sharing", Available Online at: https://arxiv.org/pdf/2111.09543.pdf, Mar. 24, 2023, 16 pages.
Hirose et al., "Selective Fine-Tuning on a Classifier Ensemble: Realizing Adaptive Neural Networks With a Diversified Multi-Exit Architecture", IEEE Access, vol. 9, Available Online at: https://ieeexplore.ieee.org/stamp/stamp.jsp?arnumber=9309311, Dec. 28, 2020, pp. 6179-6187.
Houlsby et al., "Parameter-Efficient Transfer Learning for NLP", Available Online at: https://arxiv.org/pdf/1902.00751.pdf, Jun. 13, 2019, 13 pages.
Lester et al., "The Power of Scale for Parameter-Efficient Prompt Tuning", Available Online at: https://arxiv.org/abs/2104.08691, Sep. 2, 2021, 15 pages.
Li et al., "Prefix-Tuning: Optimizing Continuous Prompts for Generation", Available Online at: https://arxiv.org/abs/2101.00190, Jan. 1, 2021, 15 pages.
Rongali et al., "Training Naturalized Semantic Parsers with Very Little Data", Available Online at: https://www.researchgate.net/publication/360310740_Training_Naturalized_Semantic_Parsers_with_Very_Little_Data, Apr. 2022, 7 pages.
Rubin et al., "SmBoP: Semi-Autoregressive Bottom-Up Semantic Parsing", Available Online at: https://arxiv.org/pdf/2010.12412.pdf, Apr. 11, 2021, 14 pages.
Sun et al., "A Survey of Pretrained Language Models", Knowledge Science, Engineering and Management: 15th International Conference, KSEM 2022, Aug. 6-8, 2022, pp. 442-456.
Sun et al., "Unfreeze with Care: Space-Efficient Fine-Tuning of Semantic Parsing Models", Available Online at: https://arxiv.org/pdf/2203.02652.pdf, Mar. 5, 2022, 9 pages.
Wang et al., "RAT-SQL: Relation-Aware Schema Encoding and Linking for Text-to-SQL Parsers", Available Online at: https://arxiv.org/pdf/1911.04942.pdf, Aug. 24, 2021, 12 pages.
Wolfson et al., "Weakly Supervised Text-to-SQL Parsing through Question Decomposition", Available Online at: https://arxiv.org/pdf/2112.06311.pdf, Apr. 26, 2022, 15 pages.
Zhang et al., "Side-Tuning: A Baseline for Network Adaptation via Additive Side Networks", Available Online at: https://arxiv.org/abs/1912.13503, Jul. 31, 2020, pp. 1-16.

* cited by examiner

SYSTEM AND METHOD OF SELECTIVE FINE-TUNING FOR CUSTOM TRAINING OF A NATURAL LANGUAGE TO LOGICAL FORM MODEL

CROSS-REFERENCE TO RELATED APPLICATIONS

The present application is a non-provisional application of and claims the benefit and priority under 35 U.S.C. 119(e) of U.S. Provisional Application No. 63/400,016, filed Aug. 22, 2022 entitled "SELECTIVE FINE-TUNING FOR CUSTOM TRAINING OF MACHINE LEARNING MODELS," the entire contents of which is incorporated herein by reference for all purposes.

BACKGROUND

Machine learning models are popularly used to for a variety of tasks including natural language processing, data analysis, image processing, and many others. Some of these machine-learning models are highly complex and require large amounts of time and computing resources to train.

Machine learning models are typically trained to perform a task of interest. In some cases, the training is done in stages, including a pretraining stage where the model is trained, often on a large and general data set. A fine-tuning training stage can then be executed to tailor the pretrained model to perform a specific task or analyze a specific type of data more accurately.

BRIEF SUMMARY

Machine-learning techniques are provided (e.g., a method, a system, non-transitory computer-readable medium storing code or instructions executable by one or more processors) for techniques for selective fine-tuning of a machine learning model for translating natural language to a meaning representation language such as Oracle Meaning Representation Language (OMRL).

In various embodiments, a computer-implemented method for fine-tuning a machine learning model comprising plurality of layers is provided that includes identifying an initial set of configurations, each configuration establishing a subset of the plurality of layers to be frozen and a subset of the plurality of layers to be fine-tuned; determining a configuration, of the initial set of configurations, that is optimized with respect to one or more parameters, thereby establishing a set of fine-tuning layers of the machine learning model and a set of frozen layers of the machine learning model; providing, to a remote system, an input for the machine learning model; obtaining, from the remote system, an output of the set of frozen layers of the machine learning model given the provided input; locally storing the obtained output of the set of frozen layers; loading, from the remote system, the set of fine-tuning layers of the machine learning model; and for a plurality of iterations, fine-tuning the set of fine tuning layers of the machine learning model by: retrieving the locally stored output of the set of frozen layers, and updating weights associated with the set of fine-tuning layers of the machine learning model, thereby generating a customized machine learning model.

In some embodiments, the machine learning model comprises: a Pre-trained Language Model (PLM) component; a Relation-Aware Transformer (RAT) component; and a decoder component configured to generate a database query representation.

In some embodiments, the database query representation is an intermediate database query representation, and the method further comprises providing a natural language utterance as input to the customized machine learning model; executing the customized machine learning model to generate an intermediate database query representation of the natural language utterance; converting the intermediate database query representation of the natural language utterance to a database query in a selected database query language; and executing the database query on a database to retrieve data responsive to the natural language utterance.

In some embodiments, the method further comprises providing a natural language utterance as input to the customized machine learning model; executing the customized machine learning model to generate a database query representation of the natural language utterance; and executing the database query representation on a database to retrieve data responsive to the natural language utterance.

In some embodiments, determining the configuration, of the initial set of configurations, that is optimized with respect to the one or more parameters comprises executing a hypertuning process to optimize an accuracy of the machine learning model.

In some embodiments, the set of configurations is a first set of configurations and the hypertuning process is a first hypertuning process, and wherein determining the configuration further comprises: identifying, based on the first hypertuning process, a candidate configuration; performing an accuracy evaluation of the machine learning model using the candidate configuration; determining a second set of configurations based on the accuracy evaluation; executing a second hypertuning process to optimize the accuracy of the machine learning model based on the second set of configurations; and selecting the configuration, of the initial set of configurations, based on the second hypertuning process.

In some embodiments, the hypertuning process comprises removing configurations that correspond to a training time above a threshold value.

In various embodiments, a system is provided that includes one or more data processors and one or more non-transitory computer readable media storing instructions which, when executed on the one or more data processors, cause the one or more data processors to perform part or all of the operations and/or methods disclosed herein.

In various embodiments, one or more non-transitory computer-readable media are provided for storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
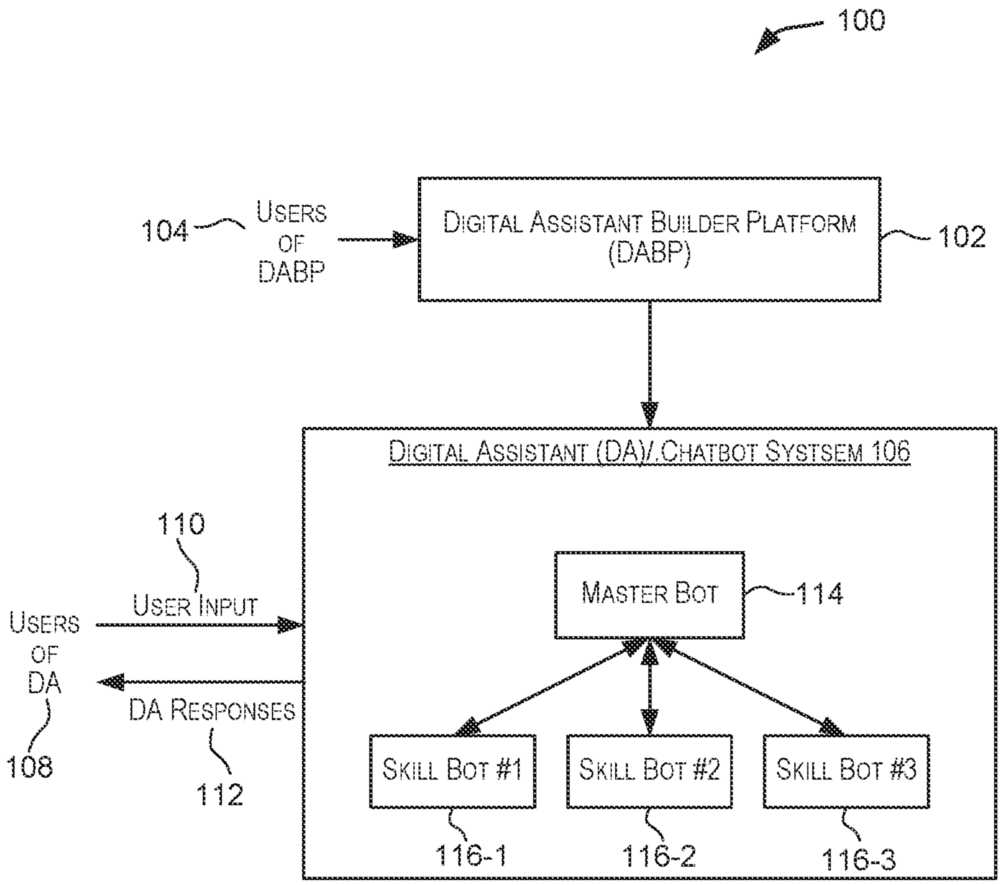
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The FIGS. and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

As noted above, complex machine learning models can require large amounts of time and computing resources to configure and train. One situation in which a large model is particularly cumbersome is in a custom fine-tuning process, in which a pretrained model may be loaded from one system to another system and fine-tuned on the other system. The techniques described herein selectively fine-tune and load specific layers of a multilayer model to significantly reduce model load and training times.

One application that involves custom fine-tuning a large and complex pretrained model is in natural language processing, which often involves models with many layers, and often millions of parameters, making loading and training such a model on the client side particularly cumbersome. In particular, the fine-tuning techniques are described herein with respect to Conversation to Oracle Meaning Representation Language (C2OMRL), a machine learning model configured to receive input natural language utterances and generate an intermediate database query representation that can be converted into various database query languages to execute a query on a database corresponding to the custom model (i.e., the model has been customized to accurately generate a query for this particular database schema).

As used herein, when an action is "based on" something, this means the action is based at least in part on at least a part of the something. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can be communicated by various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:

(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and the their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section (b) a default transitions section (c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
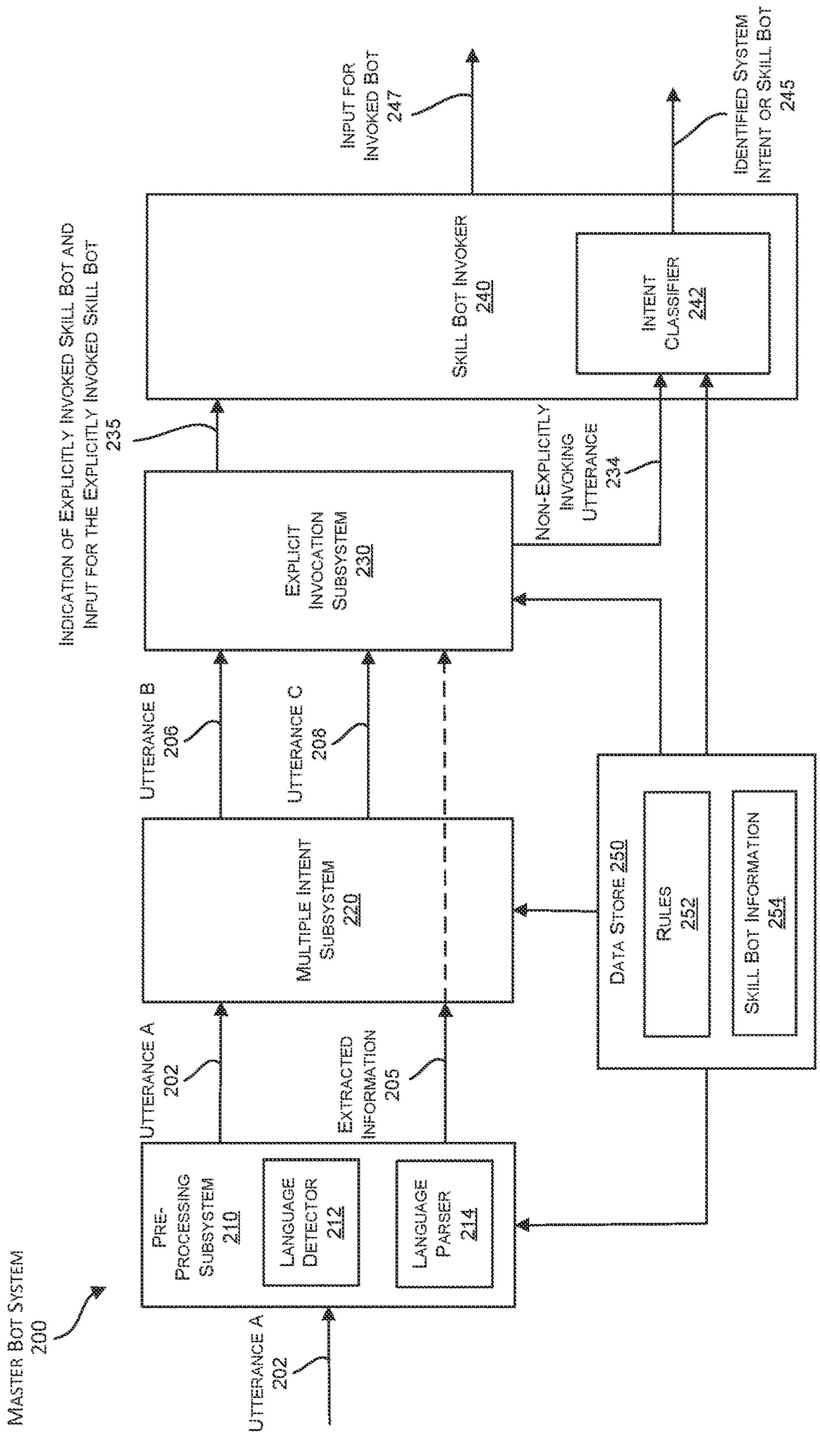
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
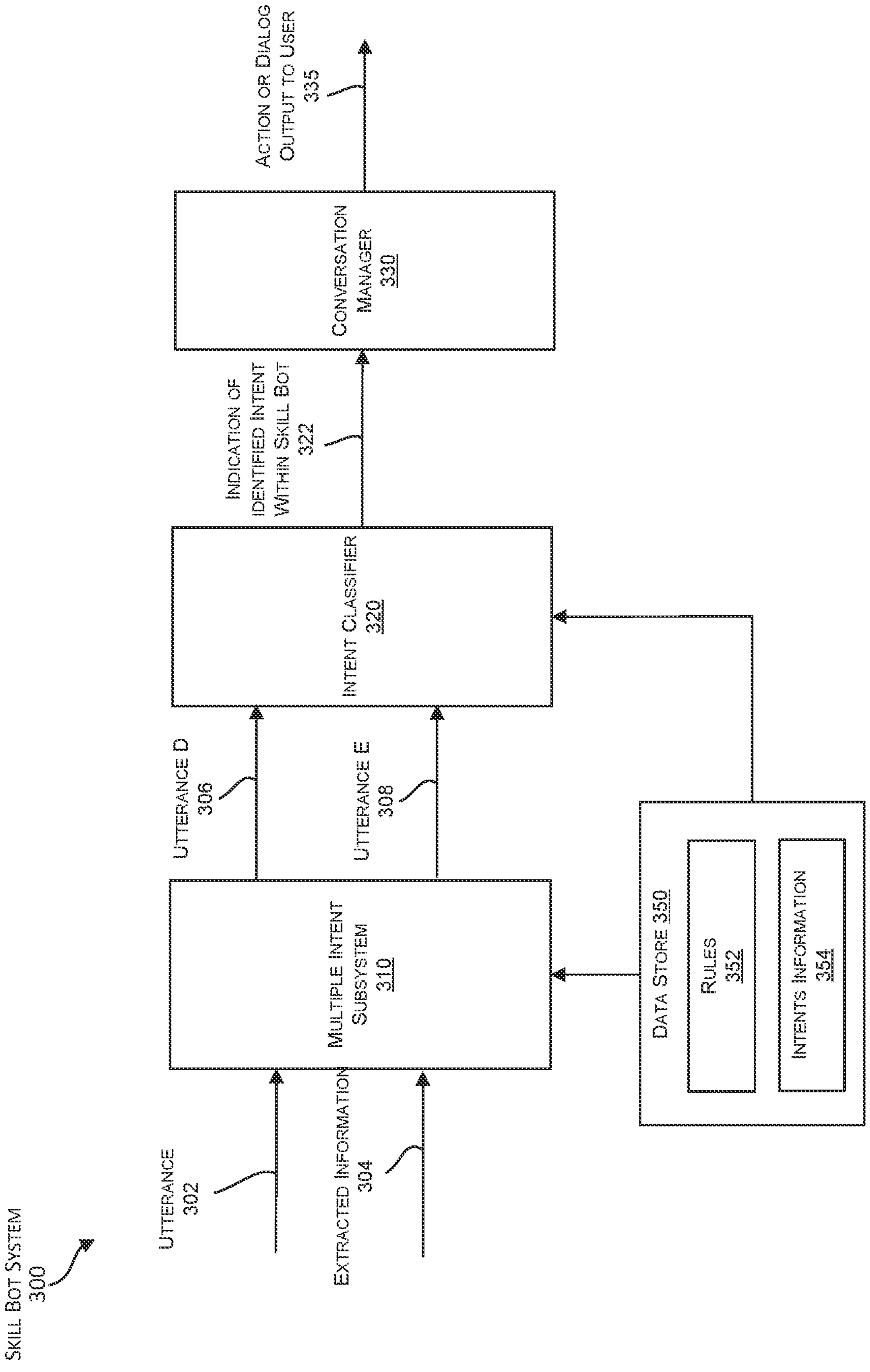
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was “Pizza Bot”, then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine learning model) can be stored as part of skill bot information 254.

In certain embodiments, the intent classifier 242 is implemented using a machine learning model, as described in further detail herein. Training of the machine learning model may involve inputting at least a subset of utterances from the example utterances associated with various skill bots to generate, as an output of the machine learning model, inferences as to which bot is the correct bot for handling any particular training utterance. For each training utterance, an indication of the correct bot to use for the training utterance may be provided as ground truth information. The behavior of the machine learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot.

The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine learning model. The machine learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Selectively Fine-Tuning for Custom Training in the C2OMRL System

The selective fine-tuning techniques described herein are particularly useful for machine learning models with many parameters that will be customized by multiple entities. One example of such a model is the C2OMRL model, which is a deep-learning model configured to convert a NL (Natural Language) utterance into a logical form like OMRL that can be converted into an SQL query that eventually can be executed against a database. This deep-learning model (referred to herein as the "C2OMRL semantic parser" or "C2OMRL model") is pre-trained with general-domain datasets on the order of thousands of examples. This pre-trained model is transmitted (e.g., loaded) in whole or in part to a remote system (e.g., a customer computing system). Then, the pretrained model is customized or fine-tuned, which may be done with a relatively small number of customer-related examples. The process of training the model on the additional customer examples, called custom training (or fine-tuning the model on customer examples), is subject to several constraints.

The time to load the C2OMRL semantic parser model in the custom training platform, before the custom training can actually start, should be limited. This puts a constraint on the custom model size on disk, which should be small enough to be quickly loaded. For example, some models may take 5 or 10 minutes or more to load before even starting the training, which is not ideal.

The time to complete the custom training should be limited (e.g., no more than 1 hour or 2). Since the C2OMRL model is a large deep-learning model, which may have about 100-200 million parameters, fine-tuning the entire model (full fine-tuning) might incur very long waiting times for the users/developers, e.g., to (1) load the model and (2) train the model with the additional custom-train examples. The techniques described herein address these issues by fine-tuning only a portion of the model, to achieve significant speedup in train time and initial model loading (since only the portion of the model that will be fine-tuned is fully loaded) while effectively preserving mostly similar performance as full fine-tuning. Although the techniques are described extensively in the context of the C2OMRL model herein, it should be understood that various selective fine-tuning techniques described herein can be applied to other machine learning models.

C2OMRL Model

The C2OMRL system is powered by a deep learning model configured to convert a natural language (NL) utterance (or a conversation within the Oracle Digital Assistant platform) into a logical form in an intermediate database query language such as Oracle Meaning Representation Language (OMRL). The logical form can be used to generate a query in a specific database query language, e.g., SQL, which can then be executed for querying an existing database. This deep learning model (referred to as a "C2OMRL semantic parser" or "C2OMRL model") is trained with thousands of example pairs (natural language to logical form).

Figure 4:
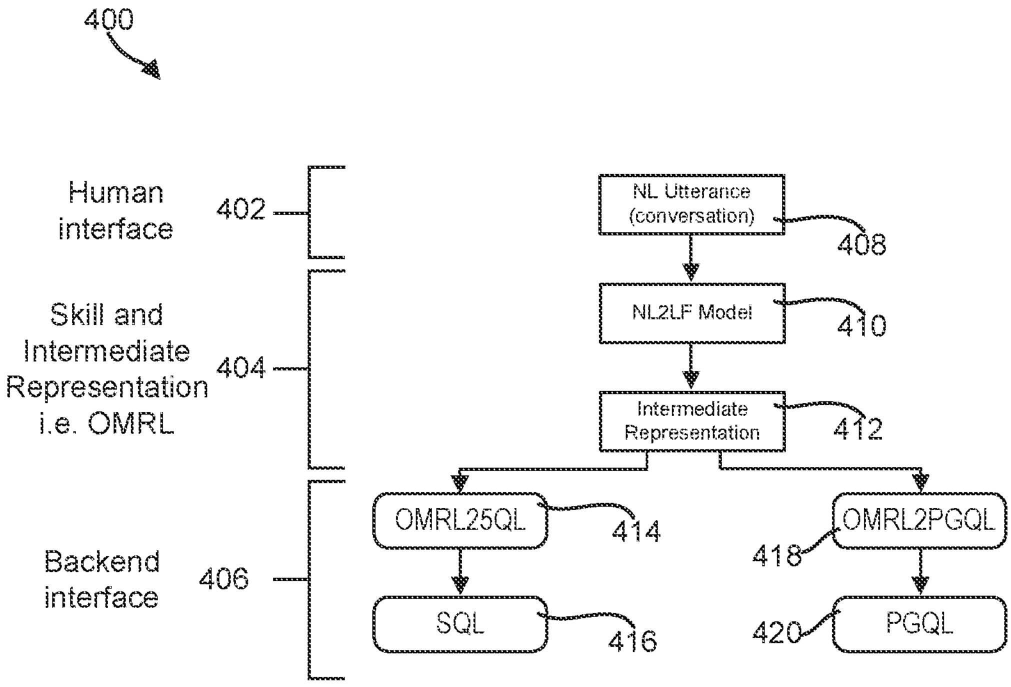
FIG. 4 is a block diagram illustrating an overview of a C2OMRL architecture and process for generating a query for a backend interface starting with a natural language utterance, in accordance with various embodiments.

FIG. 4 is a block diagram 400 illustrating an overview of the C2OMRL architecture with an overview of a process for generating a query for a backend interface 406 starting with a natural language (NL) utterance 408, e.g., as received via a human interface 402. For example, the human interface 402 can be a chatbot system that receives spoken speech and translates it to a text utterance, as described above, or a system where a user types in a request in natural language, or other suitable interfaces. The NL utterance 408 can be in the form of part of a conversation (e.g., "Hello, can you tell me how many orders we need to send out tomorrow?" or "Search for all employees with first name starting with 'S' and living in California.").

The NL utterance 408 is provided to a NL2LF model 410, which converts the NL utterance 408 to an intermediate representation 412. The NL2LF model 410 is a machine learning model trained to generate intermediate representations 412 from NL utterances 408. The NL2LF model 410 can include multiple layers and algorithms for generating intermediate representations 412 from NL utterances 408.

In some instances, as depicted in FIG. 4, the NL2LF model 410 is Conversation to Oracle Meaning Representation Language (C2OMRL) model for converting a conversational utterance to an intermediate Oracle Meaning Representation Language (OMRL) representation 412. The NL2LF model 410 may be described interchangeably herein with C2OMRL, although it should be understood that the techniques described herein can be applied to models configured to generate other intermediate representation 412 formats.

The intermediate representation 412 is a logical representation of the utterance, which is configured to be translatable into a specific database query language. In some examples, the intermediate representation 412 is in Oracle Meaning Representation Language (OMRL), an intermediate database query language with a specialized schema and interface specification as described herein. The intermediate representation 412 may be described interchangeably herein with OMRL, although it should be understood that the techniques described herein can be applied to other intermediate representation 412 formats.

The intermediate representation 412 can then be translated to one or more desired query formats, such as SQL 416 using an OMRL2SQL 414 translation process, or to PGQL 420 using an OMRL2PGQL 418 translation process. The translated query (e.g., SQL 416 or PGQL 420) represents the concepts that are present in intermediate representation 412 in a manner that conforms to the requirements of the applicable query language. As described above, the process of generating a model to generate a backend interface 406 facing query (e.g., SQL 416 or PGQL 420) is time-consuming and involves processing massive amounts of data. In comparison, the OMRL2SQL 414, OMRL2PGQL 418, and similar frameworks for translation from the intermediate representation 412 to a query in a language such as SQL 416, PGQL 420, etc. are relatively quick to build and execute. Since such translations are initiated from an intermediate representation that is configured to be translated into a database query language, the models for performing the translations 414, 418 do not need to be trained on large corpuses of natural language training samples. Thus, the architecture and techniques described herein can significantly reduce training times for generating a platform for translating natural language utterances into in multiple query languages.

Figure 5:
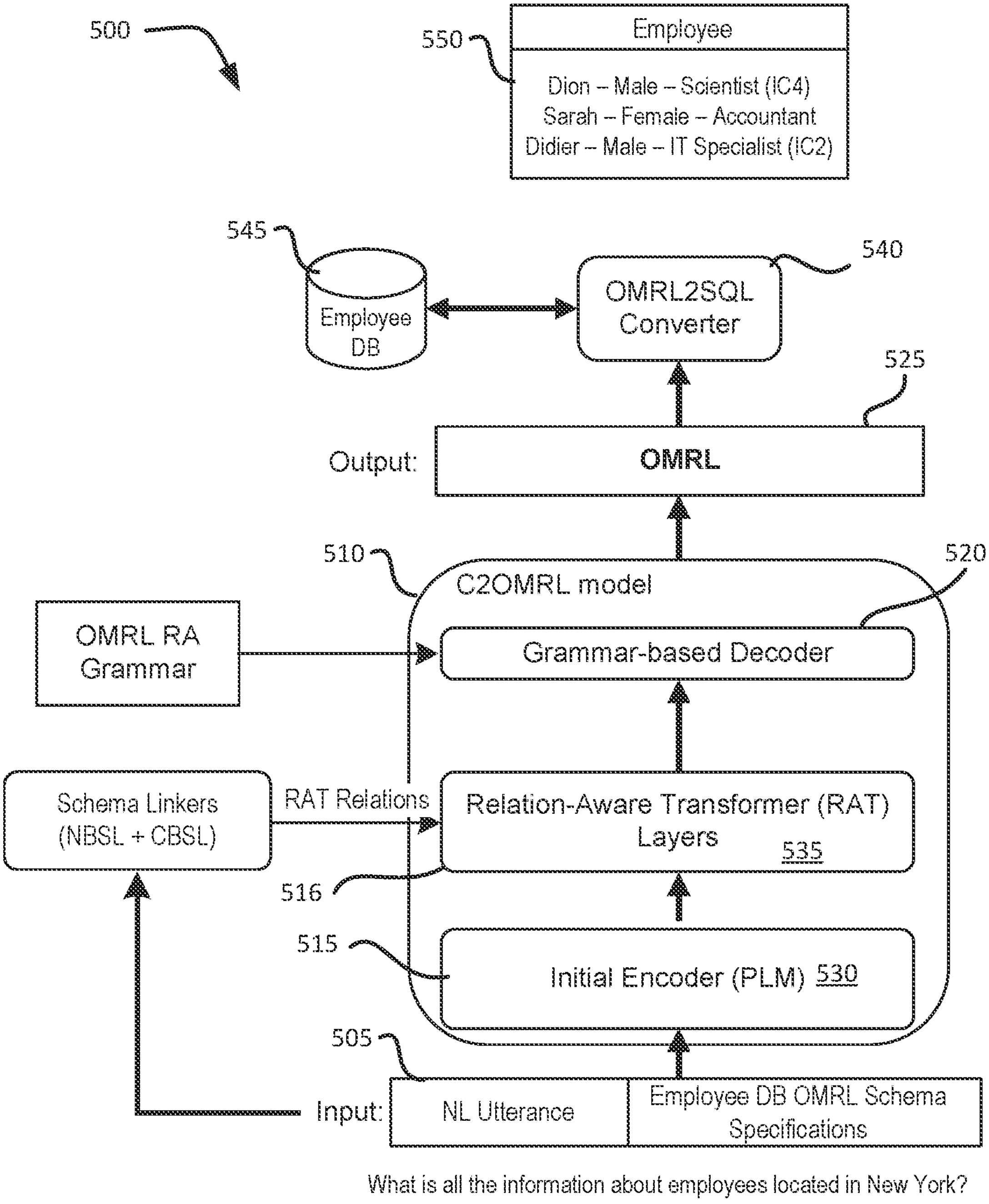
FIG. 5 is a simplified block diagram of the C2OMRL architecture in accordance with various embodiments.

Overview of System for Translating Natural Language to Meaning Representation Language FIG. 5 shows a C2OMRL system 500 is powered by a machine learning model to be able to convert a natural language (NL) utterance (e.g., an utterance within the Digital Assistant platform as described with respect to FIGS. 1-3) into a logical form (LF) statement such as an OMRL representation which then can be translated into an SQL query by an OMRL2SQL translation process 540, which in turn can be executed for querying an existing system such as a relational database. This machine learning model (referred to herein as the "C2OMRL semantic parser" or "C2OMRL model") is trained on hundreds to thousands of annotated example pairs (natural language and logical form pairs) for translating a natural language utterance into a logical form statement. As shown, an example 505 (concatenation of a natural language utterance and the database schema, e.g., sequence of table and column names) is input into the C2OMRL model 510.

In some embodiments, the examples 505 are generated by concatenating a natural language (NL) utterance with a database (DB) schema specification characterizing the database to be queried. The DB schema specification can, for example, include table and column names indicating the database to be queried. As an example, consider a simple DB schema with 1 table (invoices) with 4 columns, as shown below.

TABLE 1

| INVOICES | | | |
|---|---|---|---|
| Invoice number | Supplier | Status | Amount |
| 111 | Marcopolo | Paid | $500 |
| 222 | Mary | Approved | $100 |

For the NL utterance "What are the invoices for supplier Mary," example 505 model input is represented by the following concatenation of NL utterance and DB schema:

TABLE 2

| | |
|---|---|
| <s>What are the invoices for supplier Mary</s> | Invoice </s> Invoice num </s> Supplier </s> Amount </s> |

The example 505 is first processed by the encoder component 515, which captures the representation of the natural language utterance and the database schema contextually. The decoder 520 then receives the encoded input and predicts the logical form 525 (e.g., OMRL, which is a SQL-like query) based on the captured representation of the natural language utterance and the database schema.

In the C2OMRL model 510, the encoder component 515 includes two encoders (1) a first encoder, which is a Pre-trained Language Model (PLM) 530; and (2) a second encoder, which is a Relation-Aware Transformer (RAT) 535. The PLM 530 is used to embed the natural language utterance and database schema, as it captures a representation of the natural language utterance and the database schema contextually. In certain instances, a transformer-based PLM called Decoding-enhanced BERT with disentangled attention (DeBERTa) is used as the PLM 530. (See He et al., DeBERTaV3: Improving DeBERTa using ELECTRA-Style Pre-Training with Gradient-Disentangled Embedding Sharing (2021), the entire contents of which are hereby incorporated by reference full all purposes). Transformer-based PLMs learn universal language representations from large volumes of text data using self-supervised learning and transfer this knowledge to downstream tasks. These models provide good background knowledge to downstream tasks which avoids training of downstream models from scratch. The RAT 535 encodes the relations between so-called entities (words of tables and columns) in the database schema and words in the natural language utterance (these relations are called "schema linking" relations).

The decoder 520 is based on a bottom-up generative process (i.e., the bottom-up generative process generates a tree from a bottom (leaf nodes) up to the top (root node)), where the final generation output is a OMRL tree (i.e., a tree-based structure that represents the full OMRL logical form) that can be reconstructed to an OMRL logical form 525 output. The bottom-up generative process is implemented using a beam search, which is a heuristic search algorithm that explores a graph by expanding the most promising node in a limited set. The beam search works in steps (e.g., ~10 steps), also called "beam levels". At each step (e.g., "step i"), the beam search algorithm generates a number F of possible sub-trees for an input sequence that can be obtained by extending the current sub-trees (from step "i−1"), and then selects the top-K sub-trees (known as beam width) for retention using the conditional probability associated with each sub-tree. The conditional probability is referred to herein as a "raw beam score", and thus the top-K intermediate results (to be considered in the next generative step) are the K ones with the highest raw beam scores. Additional information for the bottom-up generative process is found in "Ohad Rubin and Jonathan Berant. 2021. SmBoP: Semi-autoregressive Bottom-up Semantic Parsing. In Proceedings of the 2021 Conference of the North American Chapter of the Association for Computational Linguistics: Human Language Technologies, pages 311-324, Online. Association for Computational Linguistics," the entire contents of which are hereby incorporated by reference full all purposes. The final decoder 520 output is the sub-tree with the highest raw beam score at the last step N.

For example, at a first step (beam level 1), the encoded input utterance and database schema are input to the decoder 520 and the decoder 520 will apply a softmax function to all the tokens in a vocabulary or grammar to find the best alternatives for a first sub-tree (e.g., a first token or node of a tree). To generate the number F of possible sub-trees (known as the frontier), the decoder 520 makes predictions representing the conditional probability of each token in the vocabulary or grammar coming next in a sequence (the likely value of yi+1, conditioned on the previous tokens $y_1, \ldots, yi$ and the context variable c, produced by the encoder to represent the input sequence). The vocabulary or grammar is obtained from a corpus comprising words or terms in the target logical form (e.g., OMRL). In certain instances, the corpus further comprises rules for the words or terms in the target logical form. The rules define how the words or terms may be used to create a proper phrase or operation in the target logical form (e.g., the combination of terms that work together for a proper OMRL query). The beam search algorithm then selects the top-K sub-trees with the highest conditional probability or raw beam score as the most likely possible choices for the time step. In this example, suppose the top-K sub-trees or beam width is 2 and that the sub-trees with the highest conditional probabilities $P(y_1|c)$ in the first step are sub-tree_1 and sub-tree_12. The top-K results can be a selectable and/or optimizable hyperparameter. Sub-tree_1 and sub-tree_12 and the corresponding conditional probabilities or raw beam scores are saved in memory.

At a second step (beam level 2), the two selected trees (sub-tree_1 and sub-tree_12) from the first step are input to the decoder 520 and the decoder 520 will apply the softmax function to all the tokens in the vocabulary or grammar to find the two best alternatives for the second sub-tree (e.g., a first and second token or node of a tree). While doing this, the beam search algorithm will determine the combination of the first and second tokens or nodes that are most likely to form a pair or second sub-tree using the conditional probabilities. In other words, for all $y_2 \in Y$, the beam search algorithm computes $P(\text{sub-tree\_1}, y_2|c) = P(\text{sub-tree\_1}|c) P(y_2|\text{sub-tree\_1}, c)$, $P(\text{sub-tree\_12}, y_2|c) = P(\text{sub-tree\_12}|c) P(y_2|\text{sub-tree\_12}, c)$, and select the largest two among these values, for example $P(\text{sub-tree\_22}|c)$ and $P(\text{sub-tree\_37}|c)$. Sub-tree_22 and sub-tree_37 and the corresponding conditional probabilities or raw beam scores are saved in memory.

At a third step (beam level 3), the two selected trees (sub-tree_22 and sub-tree_37) from the second step are input to the decoder 520 and the decoder 520 will apply the softmax function to all the tokens in the vocabulary or grammar to find the two best alternatives for the third sub-tree (e.g., a first, second, and third token or node of a tree). While doing this, the beam search algorithm will determine the combination of the first, second, and third tokens or nodes that are most likely to form a string or third sub-tree using the conditional probabilities. In other words, for all $y_3 \in Y$, the beam search algorithm computes $P(\text{sub-tree\_22}, y_3|c) = P(\text{sub-tree\_22}|c) P(y_3|\text{sub-tree\_22}, c)$, $P(\text{sub-tree\_37}, y_3|c) = P(\text{sub-tree\_37}|c) P(y_3|\text{sub-tree\_37}, c)$, and select the top-K sub-trees. The top-K sub-trees and the corresponding conditional probabilities or raw beam scores are saved in memory. This process continues until N number of beam levels is completed (this could be an optimized or selected hyperparameter). The final model output is the sub-tree with the highest conditional probability or raw beam score at the last step N (beam level N). The tokens or nodes of this final sub-tree can then be mapped to a final logical form such as OMRL logical form statement 525.

The predicted OMRL logical form statement 525 (i.e., the OMRL tree with the highest raw beam score at the last step N) can then be input into a language converter 540 such as (OMRL2SQL) to translate the meaning representation language to a systems language query or command such as SQL, APIs, REST, GraphQL, PGQL, etc. The systems language query or command can then be used to query or execute an operation on a system 545 (e.g., a relational database) and obtain an output 550 as a result of the query or command.

Figure 6:
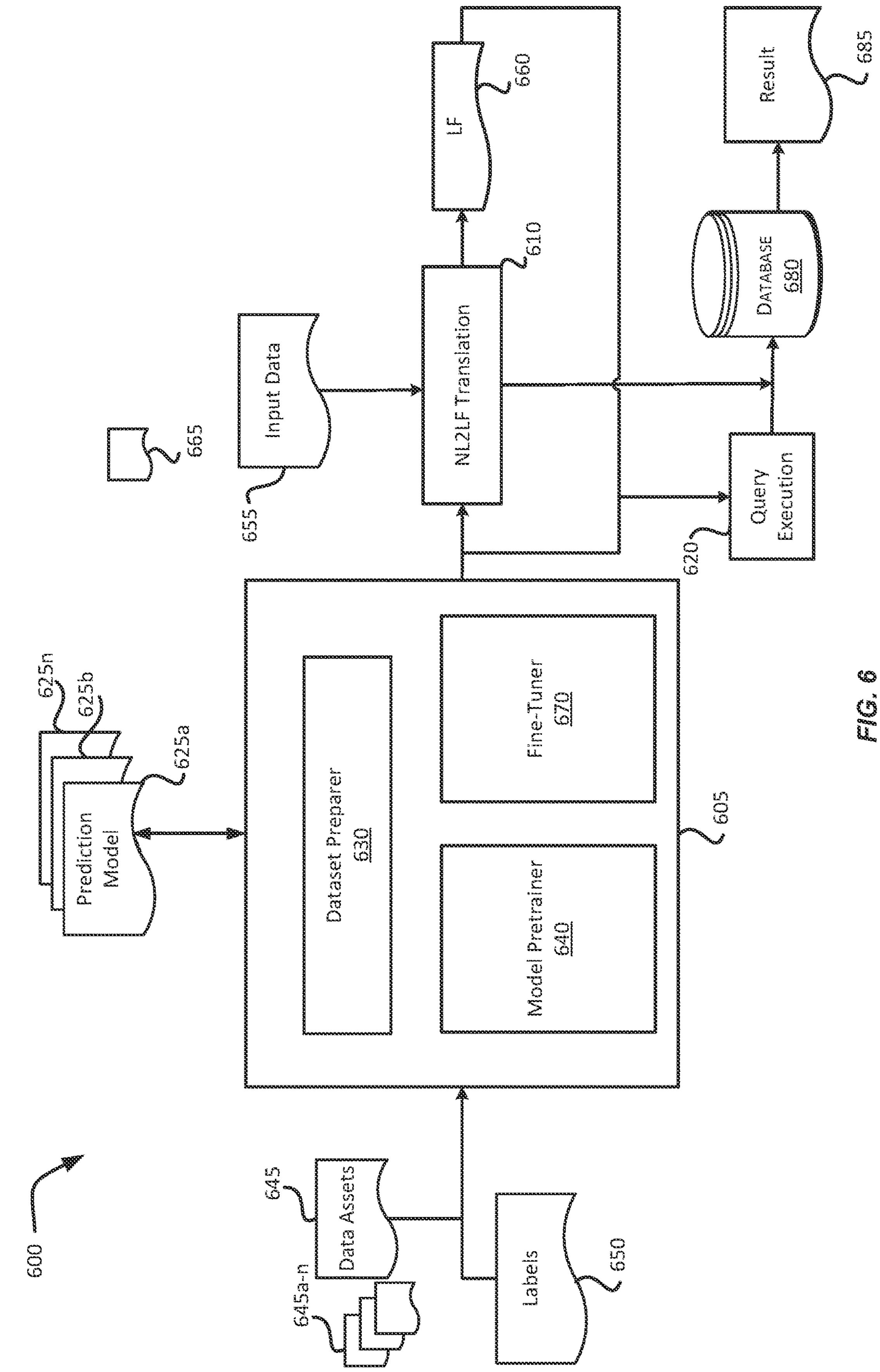
FIG. 6 illustrates a model system for training and deploying models in accordance with various embodiments.

FIG. 6 shows a block diagram illustrating aspects of a model system 600 configured to for training and deploying machine learning models (e.g., the NL2LF machine learning model described above with respect to FIGS. 4-5). The model system 600 in this example includes various stages: a training stage 605 to train machine learning models, a NL2LF translation stage 610 to translate natural language text (e.g., an utterance) to a logical form such as OMRL, and a query execution stage 620 to execute the logical form on a system such as database to obtain a result (e.g., an answer to a query within an utterance). The training stage 605 builds and trains one or more machine learning models 625*a*-625*n* ('n' represents any natural number) to be used by the other stages (which may be referred to herein individually as a model 625 or collectively as the models 625). For example, the models 625 can include a first model for translating a natural language utterance to a logical form in an intermediate database query language and second model for translating the logical form to a particular database query language. Still other types of prediction models (e.g., an intent classifier) may be implemented in other examples according to this disclosure.

In some embodiments, a model 625 is configured as a sematic parser or NL2LF model such as RAT-SQL (as encoders) in combination with a Semi-autoregressive Bottom-up Semantic Parsing model (SMBOP) (as decoder). Additional information for the RAT-SQL model is found in "RAT-SQL: Relation-Aware Schema Encoding and Linking for Text-to-SQL Parsers" by Wang et al., published in Proceedings of the 58th Annual Meeting of the Association for Computational Linguistics, the entire contents of which are hereby incorporated by reference for all purposes. Additional information for the SMBOP model is found in Ohad Rubin and Jonathan Berant. 2021. "SmBoP: Semi-autoregressive Bottom-up Semantic Parsing." In Proceedings of the 2021 Conference of the North American Chapter of the Association for Computational Linguistics: Human Language Technologies, pages 311-324, Online. Association for Computational Linguistics, the entire contents of which are hereby incorporated by reference for all purposes.

To train the various models 625, the training stage 605 is comprised of three main subsystems or services: dataset preparer 630, model pretrainer 640, and fine-tuner 670. The dataset preparer 630 facilitates the process of loading data assets 645, splitting the data assets 645 into training and validation sets (645-*a-n*) so that the system can train and test the models 625, and performing basic natural language pre-processing (e.g., standardization, normalization, tokenizing data, augmentation, etc.). The data assets 645 include natural language utterances (e.g., natural language questions/requests) as inputs and OMRL logical forms as outputs, obtained from one or more sources such as from human annotators and/or databases (not shown). In some instances, the utterances are provided by a client or customer. In other instances, the utterances are automatically generated and/or retrieved from libraries of utterances (e.g., identifying utterances from a library that are specific to a task that a model is to learn). The data assets 645 can include input text or audio (or input features of text or audio frames) and labels 650 corresponding to the input text or audio (or input features) as a matrix or table of values. For example, for each utterance, a corresponding label may comprise an indication of the corresponding logical form (e.g., statements/queries such as OMRL queries) and/or an indication of whether the logical form was correct or incorrect for the utterance provided as ground truth information for the utterance. The behavior of the model can then be adapted (e.g., through back-propagation) to minimize the difference between the generated inferences and the ground truth information. For example, the data assets 845 can include the natural language utterance "What is the average life expectancy in the United States of America?" and a label including the corresponding logical form "SELECT AVG (life_expectancy) FROM country=United States of America" (and in some instances whether the predicted logical form was "correct" or "incorrect").

In some instances, the data assets 645 also include database schema information. A database schema defines how data is organized within a database such as a relational database; this includes logical constraints such as table names, fields, data types, and the relationships between these entities. A relational database can be formed of one or more tables with each table of the one or more tables including one or more columns with each column of the one or more columns including one or more values. Each table and column of a relational database can be named with unique identifiers, each of which can include one or more words. In some instances, one or more columns of the relational database may serve as a primary key in which each of the values of the one or more columns that serve as the primary key are unique from each other. In some instances, one or more columns of the relational database may serve as a foreign key which serves to the link the table which includes the one or more columns with another table in the relational database. In some instances, the database schema information includes one or more data structures for storing the unique identifiers of the one or more tables, the unique identifiers of the one or more columns, and values of each relational database. The unique identifiers and values can be stored by the dataset preparer 630 in one or more vectors and/or matrices. In some embodiments, a data structure storing schema information for a relational database can store a directed graph representing the unique identifiers and values.

Once the data assets 645 are obtained, the datasets may be split into training and validation datasets. The splitting may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting. Before or after splitting, basic natural language pre-processing may be performed on the data assets 645. In some instances, the pre-processing includes tokenizing the utterances of the data assets 645. Tokenizing is splitting a phrase, sentence, paragraph, or an entire text document into smaller units, such as individual words or terms. Each of these smaller units are called tokens. Smaller units are created by locating boundaries such as word boundaries, which are the ending point of a word and the beginning of the next word. For example, the text "How many employees work for company X" can be word tokenized into 'How', 'many', 'employees', 'work', 'for', 'company', 'X'. These tokens help the model to understand the context and develop the model for a given task. There are various tokenization techniques which can be used for executing the tokenizing based on the language and modeling task. For example, the tokenizing may be performed using Natural Language ToolKit, white space tokenization, dictionary-based tokenization, rule-based tokenization, Keras tokenization, Penn Tree based tokenization, spaCy tokenization, Moses tokenization, subword tokenization, or the like.

In some instances, the tokens for data assets 645 may then be embedded to word embeddings (e.g., contextualized word embeddings). A word embedding is a learned representation for text where words that have the same meaning have a similar representation. Word embeddings are generated by embedding techniques where individual words are represented as real-valued vectors in a predefined vector space so they can be understood by deep learning algorithms. The embedding techniques can be joint or individual embedding techniques such as including an embedding layer within the deep learning algorithm or using a separate model such as a BERT-based pretrained language model (e.g., BERT, RoBERTa, and DeBERTa). BERT-based models are pretrained language models that use self-supervised learning to learn the deep meaning of words and contexts. An embedding layer is a word embedding that is learned jointly with a neural network model on a specific natural language processing task, such as the natural language to logical form translation (e.g., the natural language-logical form (NL-LF) algorithm(s)).

In some instances, a first set of data assets (e.g., 645*a*, 645*b*, etc.) are prepared for a pretraining phase and a second set of data assets (e.g., 645*f*, 645*n*, etc.) are prepared for a fine tuning phase. A model 625 is pre-trained by the model pretrainer 640 using datasets from one or more different modalities or tasks. The pre-trained model is then fine-tuned using fine-tuner 670. As further described below with respect to FIGS. 7-10, selected layers are fine-tuned and other layers are frozen.

For each of the pretraining and fine-tuning phases, the model training generally includes selecting hyperparameters for the model 625 and using an optimization algorithm (e.g., a stochastic gradient descent algorithm or a variant thereof such as batch gradient descent or minibatch gradient descent) to find the model parameters that correspond to the best fit between predicted and actual outputs. The hyperparameters are settings that can be tuned or optimized to control the behavior of the model 625. Most models explicitly define hyperparameters that control different aspects of the models such as memory or cost of execution. However, additional hyperparameters may be defined and optimized to adapt a model to a specific scenario. For example, the hyperparameters may include the number of hidden units of a model, the learning rate of a model, the number of transformer layers, the top-K results, N number of beam levels, and the like.

During training by the model pretrainer 640 and fine-tuner 670, error is calculated as the difference between the actual output (e.g., as indicated by the label 650) and the predicted output (e.g., as determined by the model 625). The function that is used to compute this error is known as an objective function (e.g., a loss function or a cost function). Error is a function of internal parameters of the model, e.g., weights and bias. For accurate predictions, the error needs to be minimized. In order to minimize the error, the model parameters are incrementally updated by minimizing the objective function over the training examples from preprocessed data assets 645. The objective function can be constructed to measure the difference between the outputs inferred using the models and the ground truth annotated to the samples using the labels. For example, for a supervised learning-based model, the goal of the training is to learn a function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some machine learning algorithms such as a neural network, this is done using backpropagation. The current error is typically propagated backwards to a previous layer, where it is used to modify the weights and bias values in such a way that the error is minimized. For selective fine-tuning, the error is propagated back through a selected subset of layers. The weights are modified using the optimization function. Optimization functions usually calculate the error gradient, i.e., the partial derivative of the objective function with respect to weights, and the weights are modified in the opposite direction of the calculated error gradient. For example, techniques such as backpropagation, random feedback, Direct Feedback Alignment (DFA), Indirect Feedback Alignment (IFA), Hebbian learning, and the like are used to update the model parameters in such a manner as to minimize or maximize this objective function. This cycle is repeated until a minimum of the objective function is reached.

In some instances, natural language-logical form (NL2LF) algorithm(s) are trained by model pretrainer 640 and fine-tuner 670 using the preprocessed data assets 645 (e.g., tokenized data assets). In some instances, the NL2LF algorithm(s) comprise an encoder-decoder neural network. The encoder is comprised of an input layer and one or more encoding layers. The one or more encoding layers are based on top of contextualized word embeddings such as BERT and its family (e.g., RoBERTa, DeBERTa, etc.). The encoder follows an embedding procedure to transform the relevant text (and optionally the database schema) into number/vector representation to conserve the conditions and connection between words and sentences, such that a machine can comprehend the pattern associated with any text, make out the context of the sentences, and optionally learn relationships between words and a given database schema. The result of the encoder will be a state vector or context vector. This state vector will be the input for the decoder. The decoder is comprised of an input layer, one or more decoding layers, a dense layer, and an output layer (e.g., a layer with a softmax function). The one or more decoding layers may include multiple transformer layers. The current recurrent unit accepts a hidden state from the earlier recurrent unit. The result of the decoder will be a logical form such as a OMRL query translated from an utterance within the preprocessed data assets 645.

Once a set of model parameters are identified by the model pretrainer 640 and the fine-tuner 670, the model 625 has been trained and a validator is configured to validate the model 625 using the validation datasets. The validation process performed by the validator includes iterative operations of inputting the validating datasets into the trained model 625 using a validation technique such as K-Fold Cross-Validation, Leave-one-out Cross-Validation, Leave-one-group-out Cross-Validation, Nested Cross-Validation, or the like to tune the model parameters and ultimately find the optimal set of model parameters.

As should be understood, other training/validation mechanisms are contemplated and may be implemented within the model system 600. For example, the model 625 may be trained and model parameters may be tuned on datasets from a subset of obtained or filtered datasets and the datasets from a subset of obtained or filtered datasets may only be used for testing and evaluating performance of the model 625.

The training stage 605 including pretraining and fine-tuning outputs a trained model 625 with an optimized set of model parameters for use in the NL2LF translation stage 610. The NL2LF translation stage 610 comprises a predictor for translating input data 655 (e.g., a natural language utterance) to a logical form 660 (e.g., OMRL query). For example, the predictor executes processes for inputting input data 655 into the trained NL2LF model 665, and generating, using the trained NL2LF model 665, a logical form 660 based on features within the input data 655. In some instances, the trained NL2LF model 665 performs one or more semantic parsing tasks to generate the prediction based on the features extracted from the input data 655. The NL2LF translation stage 610 outputs a logical form 660 which can be used in the query execution stage 620.

The query execution stage 620 comprises one or more executors configured for executing the logical form 660 on a system such as database 680 to obtain a result 685 (e.g., an answer to a query within natural language utterances(s)). For example, the one or more executors may be configured to translate or convert the meaning representation language for the logical form 860 to a systems language query or command such as SQL, APIs, REST, GraphQL, PGQL, etc., and execute the systems language query or command on a relational database to obtain an answer to a query posed in the natural language utterance(s).

While not explicitly shown, it will be appreciated that the model system 600 may further include a developer device associated with a developer. Communications from a developer device to components of the model system 600 may indicate what types of input data, utterances, and/or database schema are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured.

Fine Tuning Configuration

Figure 7:
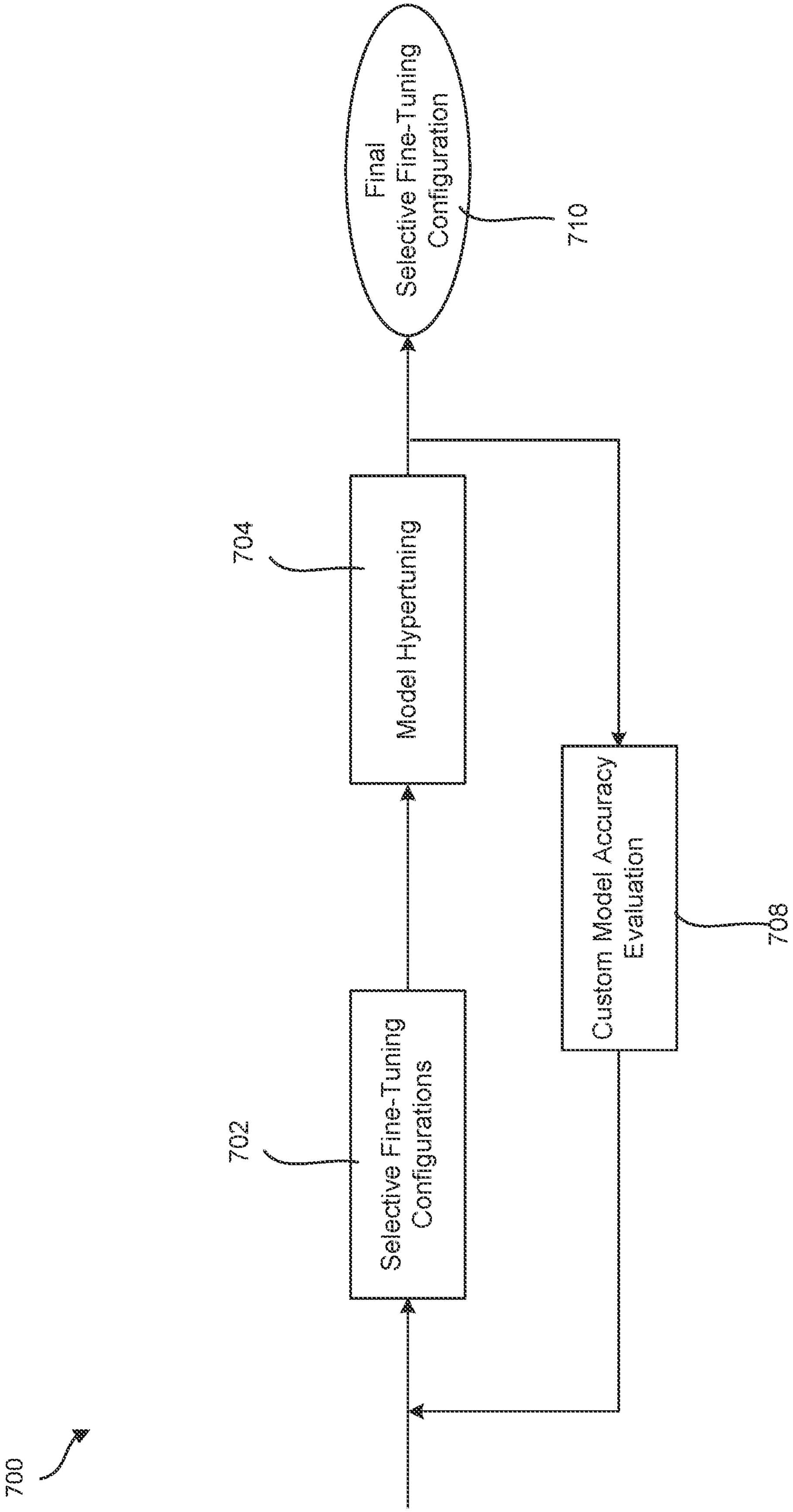
FIG. 7 is a simplified block diagram illustrating a system and method for selective fine-tuning for custom training of a machine learning model, in accordance with various embodiments.

FIG. 7 shows a simplified flow chart illustrating an overview process 700 for identifying a configuration for selective fine-tuning according to some embodiments. The final output of the process 700 is a suitable selective fine-tuning configuration, which is then adopted at run-time for the custom training of a machine learning model such as the C2OMRL model.

In some embodiments, the selective fine-tuning configuration establishes layers or components of the C2OMRL model to freeze, and layers or components of the C2OMRL model to keep unfrozen (i.e., for fine-tuning). For example, as described above, the C2OMRL model may include a PLM component having multiple layers, a RAT component having multiple layers, and a decoder component having multiple layers. As a specific example, the PLM component may have 12 layers and the RAT may have 8 layers. The selective fine-tuning configuration can establish that a component of the C2OMRL model is frozen in whole, or unfrozen in whole, or frozen in part, with specific layers being frozen. During fine-tuning training iterations, the error is backpropagated through the layers that are unfrozen, and weights associated with these layers are modified. The other layers remain frozen in the initial state. The frozen layers need not be loaded to the system performing the fine-tuning, since the output of these layers does not change during the fine-tuning process. Only the output of the frozen layers need be obtained by the recipient system, as described in further detail below in connection with FIGS. 9 and 10.

As shown in FIG. 7, in some embodiments, the selective fine tuning configuration process involves the following steps:

- Initial selective Fine-Tuning Configurations 702: As described above, the C2OMRL model may have over twenty layers, each of which could be configured for freezing or fine-tuning. Thus, there are many possible selective fine-tuning configurations. Examples of such configurations are described below with respect to FIGS. 8A-8E. The configuration process can start with selecting a range or list of possible configurations. For example, the selection may be done manually based on ad-hoc experiments. Selecting a subset of possible configurations reduces the search scope in the following hypertuning step. This constrains the search space for hypertuning to make the hypertuning process faster and avoid convergence issues.
- Model Hypertuning 704: A hyper-parameter tuner is executed to automatically search, among the available selective fine-tuning configurations, for the configuration with the best performance test accuracy.
- Custom Model Accuracy Evaluation 708. A full model accuracy evaluation is executed and used to refine the list of selective fine-tuning configurations if needed. For example, the full model accuracy evaluation may identify large regressions in test sets or other issues that trigger reassessing the initial selective fine-tuning configuration list. The list at 702 can then be modified and the hypertuning at 704 can be repeated with the modified list. This step is optional.
- The result of the above steps is a final selective fine-tuning configuration 710.

In some embodiments, the selective fine-tuning configuration can be defined as a list of pairs: (model_component, frozen_layers_range). The configuration tells, for each component, what layers of the component to freeze. The model_component establishes the component on which the "frozen_layers_range" applies (e.g., PLM/initial encoder, RAT, or decoder). The frozen_layers_range establishes the range of layers to be frozen for the corresponding component. It has been found effective to focus the freezing on the PLM and RAT components, since these two components account for most of the model size and training time.

In the model hypertuning 464 stage, a hypertuner searches among the initial selective fine-tuning configurations 462 to identify an optimal configuration (e.g., the configuration with the best accuracy on test sets). A hyperparameter optimization process may be performed to select an appropriate configuration for the fine-tuning.

In some implementations, the fine-tuning configuration is selected using suitable hyperparameter optimization techniques such as grid search, random search, or Bayesian optimization. The hyperparameters can be established using a hyperparameter tuning algorithm which chooses values for one or more hyperparameters to optimize or minimize a loss function which reflects the model's performance. The model's performance can be measured on validation or test datasets that are separate from the training datasets. For example, starting with the initial selective fine-tuning configurations 702, a fixed set of N trials is executed, where N is configurable. For each trial, a process will select a set of hyperparameters (using past trials or random search, etc.) and then perform full end-to-end training and evaluation. As described below, in some aspects, multiple hyperparameters are optimized along with the fine-tuning configuration. The trial score is computed using the evaluation result. After trials are executed, the trial with the best score is selected.

In some implementations, an additional constraint is added on training time, so that the hypertuner will automatically remove or prune all trials that exceed a given threshold on the model training time (e.g., 2 hours). Any trials that take too long to train will be automatically removed. This is important to avoid selecting a configuration that is very high performing in terms of accuracy and very slow to train.

In some implementations, as additional or alternative constraint, the hypertuner is configured to search not only for the best selective fine-tuning setup, but also for the other model hyperparameters (e.g., learning rate, number of epochs, batch size, etc.) that are the best fit for the selective fine-tuning setup. The hypertuning step not only selects the best selective fine tuning configuration, it also selects best hyperparameters of the model. For example, the hypertuner optimizes hyperparameters which determine how the training of the model is done. Examples of hyperparameters include learning rate (e.g., how fast the model will learn), number of training iterations, batch size (e.g., a number of training examples in each batch during training). Such hyperparameters are optimized as a best fit, given a particular selective fine tuning configuration.

In some implementations, the selective fine-tuning configuration is established on a first system (e.g., C2OMRL server). Based on the established selective fine-tuning configuration, a subset of the pretrained model is transmitted over a network (e.g., loaded) to a second system (e.g., a customer system performing custom fine-tuning to customize the model) for execution of the fine-tuning training.

Example Configurations

FIGS. 8A-8E illustrate examples of different selective fine-tuning configurations, according to some embodiments. In FIGS. 8B-8E, layers of the C2OMRL model that are fine-tuned during custom training are shaded. Layers that are frozen during custom training are not shaded. In these examples, the model encoder includes a PLM with 12 hidden layers, an input layer, and an output layer and a RAT with 8 hidden layers, an input layer, and an output layer.

Figures 8A, 8B, 8C, 8D, 8E:
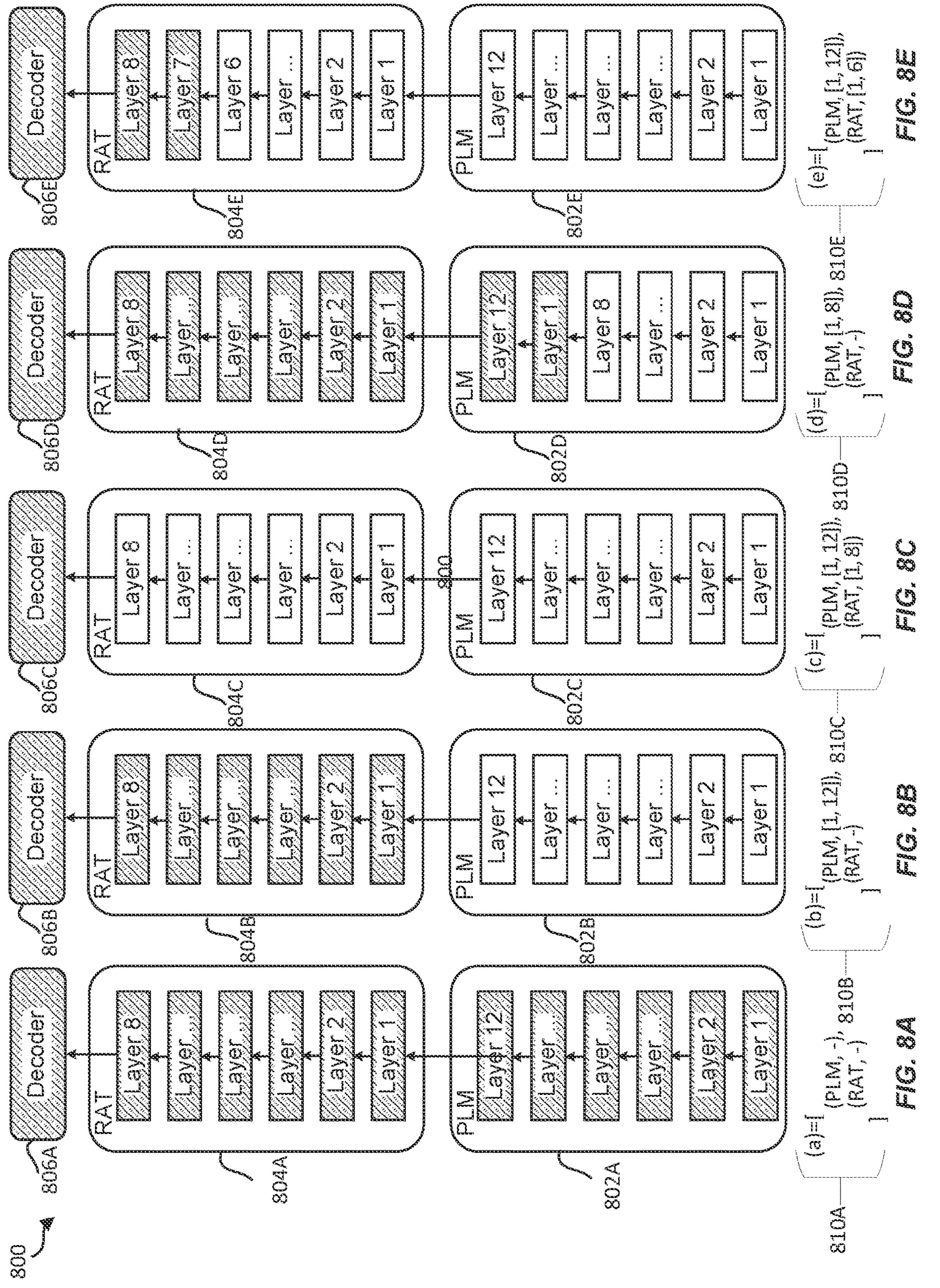
FIG. 8A, FIG. 8B, FIG. 8C, FIG. 8D, and FIG. 8E are simplified block diagrams illustrating selective fine-tuning configurations, in accordance with various embodiments.

In the example shown in FIG. 8A, the entire C2OMRL model is fine-tuned, including the 12 layers of the PLM 802A, the 8 layers of the RAT 804A, and the decoder 806A. This is a baseline configuration in which the entire C2OMRL model is fine-tuned.

In the example shown in FIG. 8B, the 12 layers of the PLM 802B are frozen. The 8 layers of the RAT 804B are fine-tuned, and the decoder 806B is fine-tuned. Thus, in this configuration, the PLM 802B component is frozen, while the RAT 804B and decoder 806B components are unfrozen and configured to be fine-tuned.

In the example shown in FIG. 8C, the 12 layers of the PLM 802C are frozen and the 8 layers of the RAT 804C are frozen. The decoder 806C is fine-tuned. Thus, in this configuration, both encoder components, the PLM 802C and the RAT 804C, are frozen.

In other configurations, components are partially frozen, i.e., a subset of layers in a component of the C2OMRL model are frozen. In the example shown in FIG. 8D, the first 8 layers of the PLM 802D are frozen (e.g., Layer 1 (the first hidden layer after the input layer), Layer 2, Layer 3, Layer 4, Layer 5, Layer 6, Layer 7, and Layer 8). The top four layers of the PLM are fine-tuned. The 8 layers of the RAT 804D are fine-tuned, and the decoder 806D is fine-tuned.

In the example shown in FIG. 8E, all layers of the PLM 802E are frozen. The bottom six layers of the RAT (e.g., Layer 1 (the first hidden layer after the input layer), Layer 2, Layer 3, Layer 4, Layer 5, and Layer 6) are also frozen. The remaining layers of the RAT 804E (e.g., Layer 7 and Layer 8) are fine-tuned. The decoder 806E is also fine-tuned.

In some embodiments, representations of each configuration 810A, 810B, 810C, 810D, and 810E are provided to the hypertuner, which will select a configuration that results in optimal model performance. The first configuration 810A is (a)=[(PLM, –), (RAT, –)], indicating that no layers of the PLM or RAT are frozen. The second configuration 810B is (b)=[(PLM, [1, 12]), (RAT, –)], indicating that layers 1-12 of the PLM and no layers of RAT are frozen. The third configuration 810C is (c)=[(PLM, [1, 12]), (RAT, [1, 8])], indicating that layers 1-12 of the PLM and layers 1-8 of the RAT are frozen. The fourth configuration 810D is (d)=[(PLM, [1, 8]), (RAT, –)], indicating that layers 1-8 of the PLM and no layers of the RAT are frozen. The fifth configuration 810E is (e)=[(PLM, [1, 12]), (RAT, [1, 6])], indicating that layers 1-12 of the PLM and layers 1-6 of the RAT are frozen.

Figure 9:
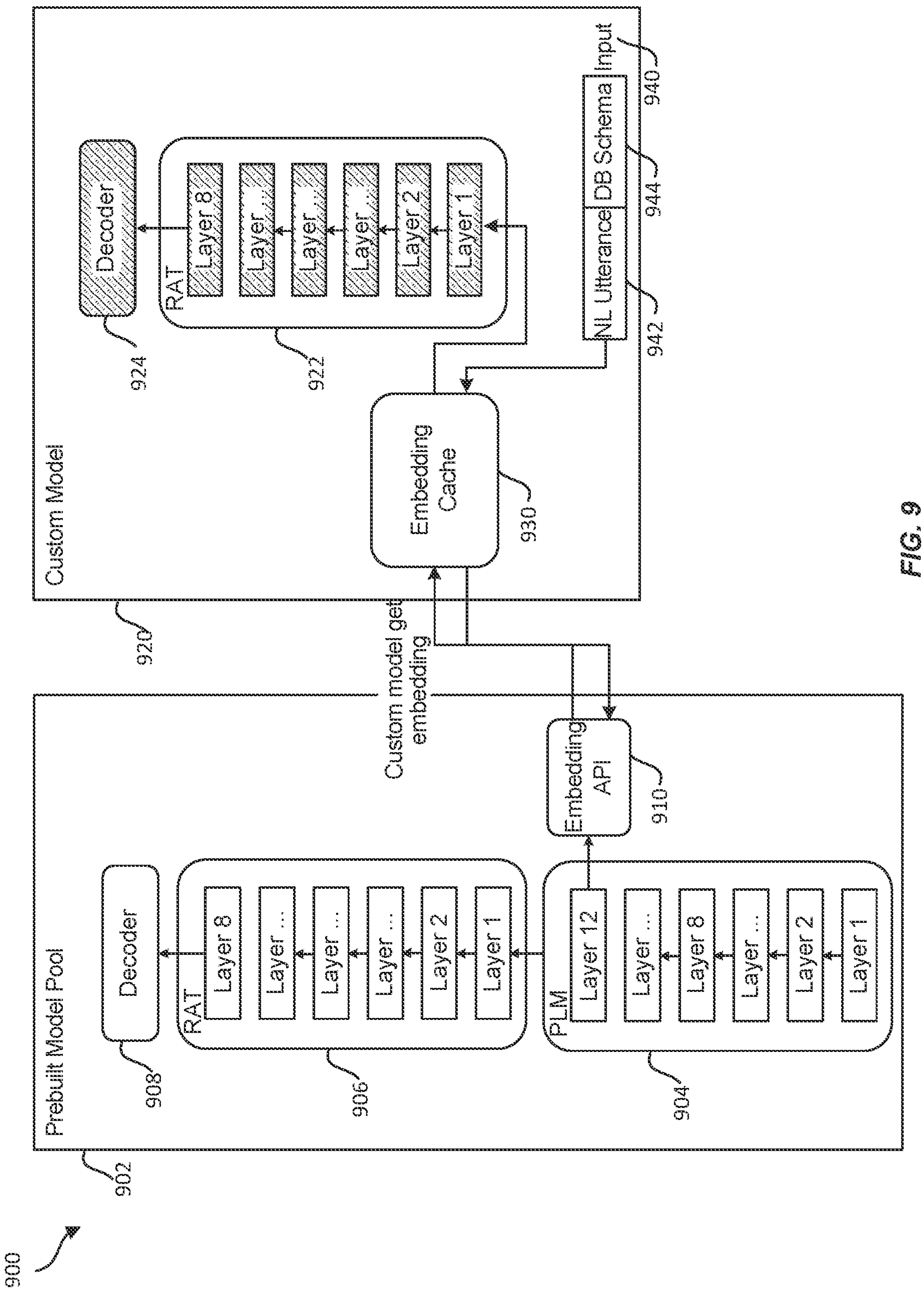
FIG. 9 is a simplified block diagram illustrating systems and methods for selective fine-tuning using an embedding cache, in accordance with various embodiments.
Figure 10:
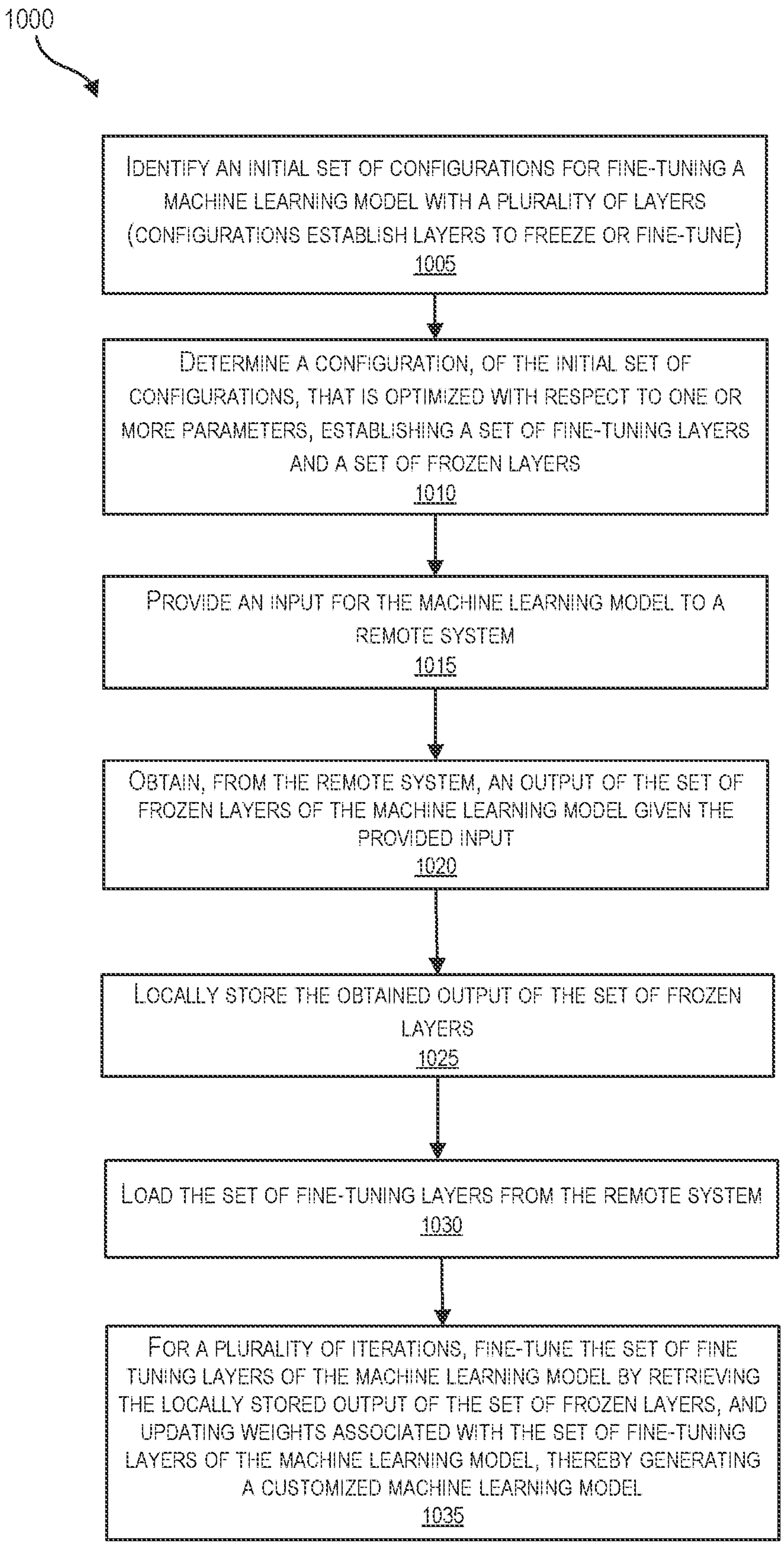
FIG. 10 illustrates a process flow for selective fine-tuning for custom training of a machine learning model, in accordance with various embodiments.

It has been found that progressively freezing the layers (e.g., from bottom to top in the models illustrated in FIGS. 8A-8E) is effective at both avoiding training convergence issues and reducing training and loading times, as described in further detail with respect to FIGS. 9 and 10.

Embedding Cache for Selective Fine-Tuning

FIG. 9 is a simplified block diagram 900 illustrating an architecture and method for selective fine-tuning using an embedding cache, in accordance with various embodiments. The selective fine-tuning techniques described herein make it possible to reduce the portion of the model to be downloaded and trained, significantly reducing the time required to both load and train the model.

The architecture depicted in FIG. 9 includes a custom model 920 and a prebuilt model pool 902. As described above, the C2OMRL model can be loaded from one system to another remote system for custom fine-tuning. However, the C2OMRL model may have hundreds of millions of parameters, resulting in a very large model which can take minutes or hours to transport from one system to another. Using the architecture depicted in FIG. 9, only the part of the original C2OMRL model that is tunable (i.e., non-frozen) is loaded. In some implementations, the prebuilt model pool 902 is remote from one or more systems that fine-tune custom models (e.g., custom systems that customize the pretrained model to suit their needs). In some implementations, the system hosting the custom model pool is the same system that builds and trains the pretrained C2OMRL model.

In some embodiments, for efficiently training the "reduced" custom model 920, a caching mechanism is implemented that temporarily stores the output of the frozen model layers from the prebuilt model pool 902. The prebuilt model pool 902 may, for example, be stored to the cloud. An embedding cache 930 local to the custom model 920 caches embeddings. The embedding cache 930 stores an intermediate representation, or "embedding", for a given input training string 940. The embeddings can be retrieved for training via an embedding API 910 local to the prebuilt model pool 902.

In some embodiments, the input training string 940 is a concatenation of NL utterance 942 and DB schema 944, as described above with respect to Table 2.

In a first training iteration (Epoch=0), the input training string 940 is provided to the embedding cache 930. The embedding cache 930 retrieves the output of the frozen model layers for that particular input by querying the embedding API 910. The embedding API 910 provides the intermediate result (embedding) from the last (top) frozen layer. The embedding is extracted from a pre-built C2OMRL model (i.e., a model instance without any custom training) available in the prebuilt model pool 902, which can be accessed from the custom training platform. The embedding is stored in the embedding cache 930.

In the following training iterations (Epoch=1 . . . K), the custom model 920 uses the embedding already stored in the embedding cache 930. Thus, there is no need to query the embedding API 910 again during the training iterations. Since the layers used to generate the cached output are frozen, the output will not change across the training iterations, and an output can be retrieved from the cache each iteration for further processing.

In some embodiments, starting with the cached output of the frozen layers, backpropagation is only applied to unfrozen layers. This technique can be used to avoid loading the frozen part of the model, as well as avoiding updating the frozen layers in training, which can save hours in many cases.

Techniques for Selective Fine-Tuning

FIG. 10 is a flowchart illustrating a process 1000 for selective fine-tuning for custom training of machine learning models. The processing depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The methods presented in FIG. 10 depict the various processing steps occurring in a particular sequence or order, this is not intended to be limiting. In certain alternative embodiments, the steps may be performed in some different order or some steps may also be performed in parallel.

At step 1005, an initial set of configurations is identified. The initial set of configurations establishes, for a machine learning model with a plurality of layers, a subset of the plurality of layers to be frozen and a subset of the plurality of layers to be fine-tuned. The initial set of configurations may be identified by receiving user input selecting several sets of configurations, such as freeze all layers, unfreeze all layers, freeze certain components and/or layers, etc. Alternatively, or additionally, the initial set of configurations can be automatically identified, e.g., randomly or by executing a rules-based approach.

In some aspects, the machine learning model includes multiple components, each of which has multiple layers. In some instances, as described above with respect to FIGS. 5 and 8A-9, the machine learning mode comprises a Pre-trained Language Model (PLM) component, a Relation-Aware Transformer (RAT) component, and a decoder component configured to generate a database query representation.

At step 1010, a configuration, of the initial set of configurations, is determined that is optimized with respect to one or more parameters. This may be performed using hyperparameter optimization as described above with respect to FIG. 7. This establishes a set of fine-tuning layers of the machine learning model to be fine-tuned and a set of frozen layers of the machine learning model to be frozen (i.e., not fine-tuned). In some aspects, the hypertuning process is executed to optimize an accuracy of the machine learning model. In some instances, a hypertuner automatically searches, among the available selective fine-tuning configurations established at step 1005, for the one with the best performance test accuracy.

In some aspects, the hypertuning process includes removing configurations that correspond to a training time above a threshold value. For example, a constraint on training time is applied so that the hypertuner will automatically prune trials that exceed a given threshold on the model training time. The threshold value for the training time may, for example, be 2 hours. Alternatively, or additionally, the hypertuner searches not only for the best selective fine-tuning setup, but also for the other model hyperparameters that are best fit for the selective fine-tuning setup. Examples of other such hyperparameters include learning rate, number of epochs, and patch size.

In some aspects, using the output of the model hypertuning, a full model accuracy evaluation is executed and used to refine the list of selective fine-tuning configurations as needed. As illustrated in FIG. 7, custom model accuracy evaluation may be implemented to arrive at a final selective fine-tuning configuration. Accordingly, the hypertuner may identify a first set of configurations in a first hypertuning process. Determining the configuration further includes identifying, based on the first hypertuning process, a candidate configuration. An accuracy evaluation of the machine learning model is performed using the candidate configuration (e.g., a full accuracy evaluation). A second set of configurations is determined based on the accuracy evaluation. Then the hypertuning is repeated as needed. For example, a second hypertuning process is executed to optimize the accuracy of the machine learning model based on the second set of configurations. The configuration, of the initial set of configurations, is selected based on the second hypertuning process.

At step 1015, an input for the machine learning model is provided to a remote system. For example, a string such as that shown in Table 2, or any suitable input, is provided to a remote system such as the prebuilt model pool 902 depicted in FIG. 9.

At step 1020, an output of the set of frozen layers of the machine learning model given the provided input is obtained from the remote system. To generate the output of the frozen layers, the remote system (e.g., the prebuilt model pool 902 shown in FIG. 9) may input the received input into the machine learning model and extract intermediate output from the last frozen layer. In some instances, this intermediate output is then retrieved from an embedding API 910 as illustrated in FIG. 9, At step 1025, the obtained output of the set of frozen layers is locally stored. In some instances, the output of the set of frozen layers is stored to a cache, such as the embedding cache 930 shown in FIG. 9.

At step 1030, the set of fine-tuning layers is loaded from the remote system. The model can be loaded in part, since the output of the set of frozen layers is also obtained. In some aspects, these are obtained separately, e.g., first the unfrozen layers are loaded from the remote system and then the output of the frozen layers are obtained, or vice-versa. Alternatively, the unfrozen layers and frozen layer output can be retrieved together.

At step 1035, for a plurality of iterations, the set of fine-tuning layers of the machine learning model are fine-tuned by retrieving the locally stored output of the set of frozen layers and updating weights associated with the set of fine-tuning layers.

The fine-tuning can include processing each of one or more training data elements (e.g., input strings as shown in Table 2) using a current version of the model to generate a prediction, calculating a loss based on the prediction and a label corresponding to the data element, and updating one or more parameters (e.g., weights) of the model based on the loss. In order to generate the prediction, multiple intermediate values may be generated for each training data element. For example, an intermediate value may include an output from a layer in the model. Each layer may generate multiple outputs (e.g., over 100, over 1,000, over 10,000, or over 100,000 outputs). In some instances, the model in its entirety is configured to generate a consistent output so long as an input is the same, the model's hyperparameters are the same, and the model's parameters are the same.

In the training process, an error can be backpropagated through the fine-tuning layers while refraining from backpropagating the error through the frozen layers. Weights associated with the fine-tuning layers are updated while weights associated with the frozen layers remain frozen, e.g., the same. Thus, the intermediate output retrieved at step 1020 does not change as the fine-tuning layers are updated, and the frozen portion of the model, which can be very large and take significant time to upload and train, does not need to be uploaded to the system performing the fine-tuning or trained at each fine-tuning iteration. This process can save a great deal of time both for loading and training the machine learning model, as shown in the example results below. Reducing the training time can also reduce the computing resource requirements of the training process.

In various embodiments, subsequent to the fine-tuning, the customized machine learning model is deployed. For example, the natural language utterance is provided as input to the customized machine learning model. The customized machine learning model is executed to generate a database query representation of the natural language utterance. In some aspects, the database query representation is then on a database to retrieve data responsive to the natural language utterance. As noted above, in some aspects, the machine learning model is configured to generate an intermediate database query representation. The customized machine learning model is executed to generate an intermediate database query representation of the natural language utterance. The intermediate database query representation of the natural language utterance is converted to a database query in a selected database query language. The database query can then be executed.

Experimental Results

Example experimental results are shown in Table 3, below. The results are based on the metrics of model size, model accuracy, and custom training time, and obtained using internal evaluation datasets. Model size, or number of parameters, is the number of parameters for the part of the model that is fine-tuned. This metric is a proxy for the final custom model size in the platform. Model accuracy is the accuracy of the model on evaluation datasets. Custom training time is the total time to run the custom training.

TABLE 3

| Setup | Custom Model Size (number of parameters) | Model Accuracy | Custom Training Time |
|---|---|---|---|
| Full fine-tuning (baseline) | 190M parameters | 0.879 | 2 h 10 min |
| Freeze PLM | 11M parameters (94% reduction) | 0.848 (only −0.03 accuracy reduction) | 49 min (62% reduction) |
| Freeze PLM and RAT | 5M parameters (97% reduction) | 0.788 | 37 min (72% reduction) |

As illustrated in Table 3, the selective fine-tuning methods described herein provide significant savings in terms of both train time and model size, while sacrificing only a small percentage of model accuracy.

Illustrative Systems

Figure 11:
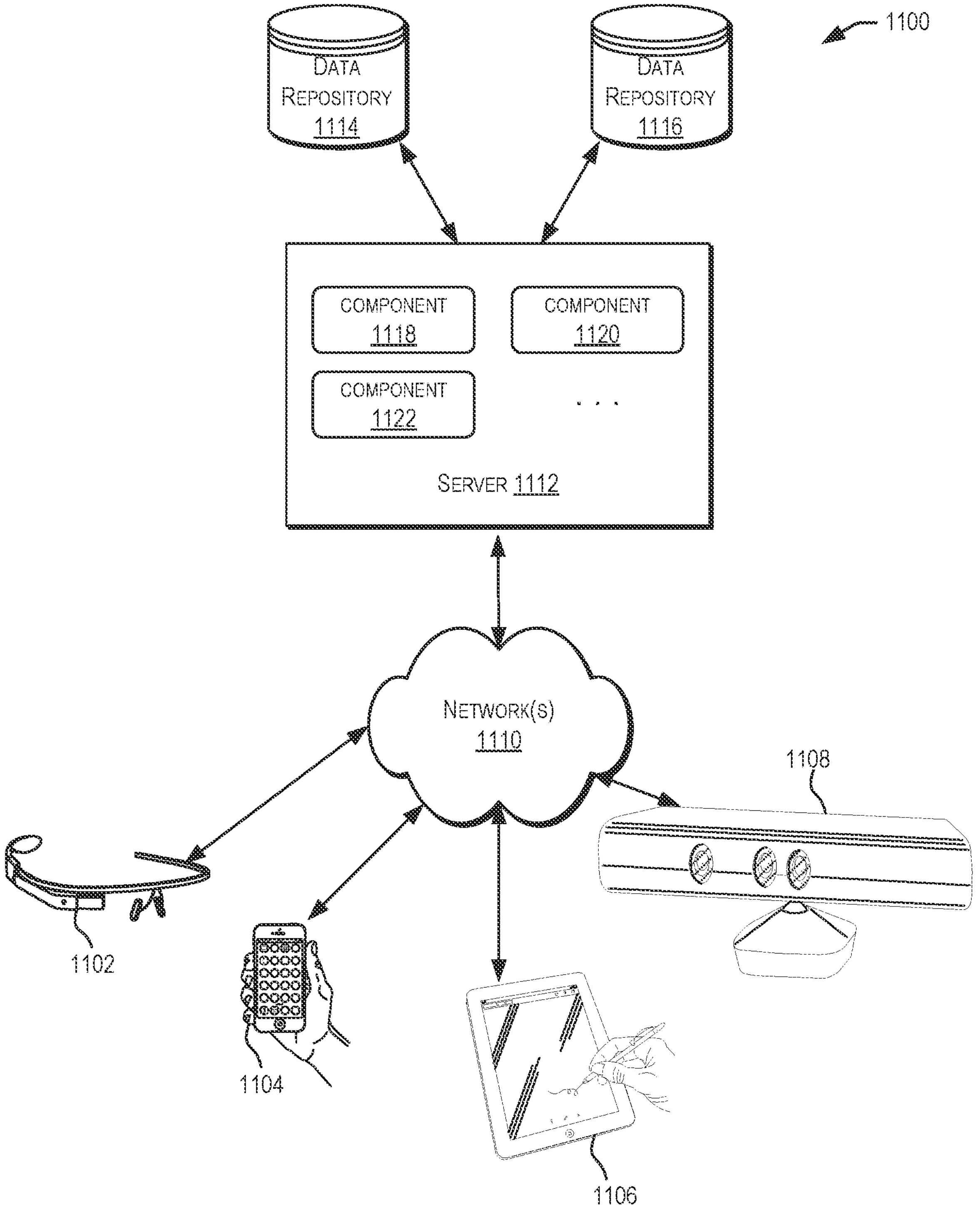
FIG. 11 depicts a simplified diagram of a distributed system for implementing various embodiments.

FIG. 11 depicts a simplified diagram of a distributed system 1100. In the illustrated example, distributed system 1100 includes one or more client computing devices 1102, 1104, 1106, and 1108, coupled to a server 1112 via one or more communication networks 1110. Clients computing devices 1102, 1104, 1106, and 1108 may be configured to execute one or more applications.

In various examples, server 1112 may be adapted to run one or more services or software applications that enable one or more embodiments described in this disclosure. In certain examples, server 1112 may also provide other services or software applications that may include non-virtual and virtual environments. In some examples, these services may be offered as web-based or cloud services, such as under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in FIG. 11, server 1112 may include one or more components 1118, 1120 and 1122 that implement the functions performed by server 1112. These components may include software components that may be executed by one or more processors, hardware components, or combinations thereof. It should be appreciated that various different system configurations are possible, which may be different from distributed system 1100. The example shown in FIG. 11 is thus one example of a distributed system for implementing an example system and is not intended to be limiting.

Users may use client computing devices 1102, 1104, 1106, and/or 1108 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 11 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1110 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1110 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1112 may include one or more virtual machines running virtual operating systems, or other computing architectures involving virtualization such as one or more flexible pools of logical storage devices that may be virtualized to maintain virtual storage devices for the server. In various examples, server 1112 may be adapted to run one or more services or software applications that provide the functionality described in the foregoing disclosure.

The computing systems in server 1112 may run one or more operating systems including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more data repositories 1114, 1116. These data repositories may be used to store data and other information in certain examples. For example, one or more of the data repositories 1114, 1116 may be used to store information such as information related to chatbot performance or generated models for use by chatbots used by server 1112 when performing various functions in accordance with various embodiments. Data repositories 1114, 1116 may reside in a variety of locations. For example, a data repository used by server 1112 may be local to server 1112 or may be remote from server 1112 and in communication with server 1112 via a network-based or dedicated connection. Data repositories 1114, 1116 may be of different types. In certain examples, a data repository used by server 1112 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1114, 1116 may also be used by applications to store application data. The data repositories used by applications may be of different types such as, for example, a key-value store repository, an object store repository, or a general storage repository supported by a file system.

Figure 12:
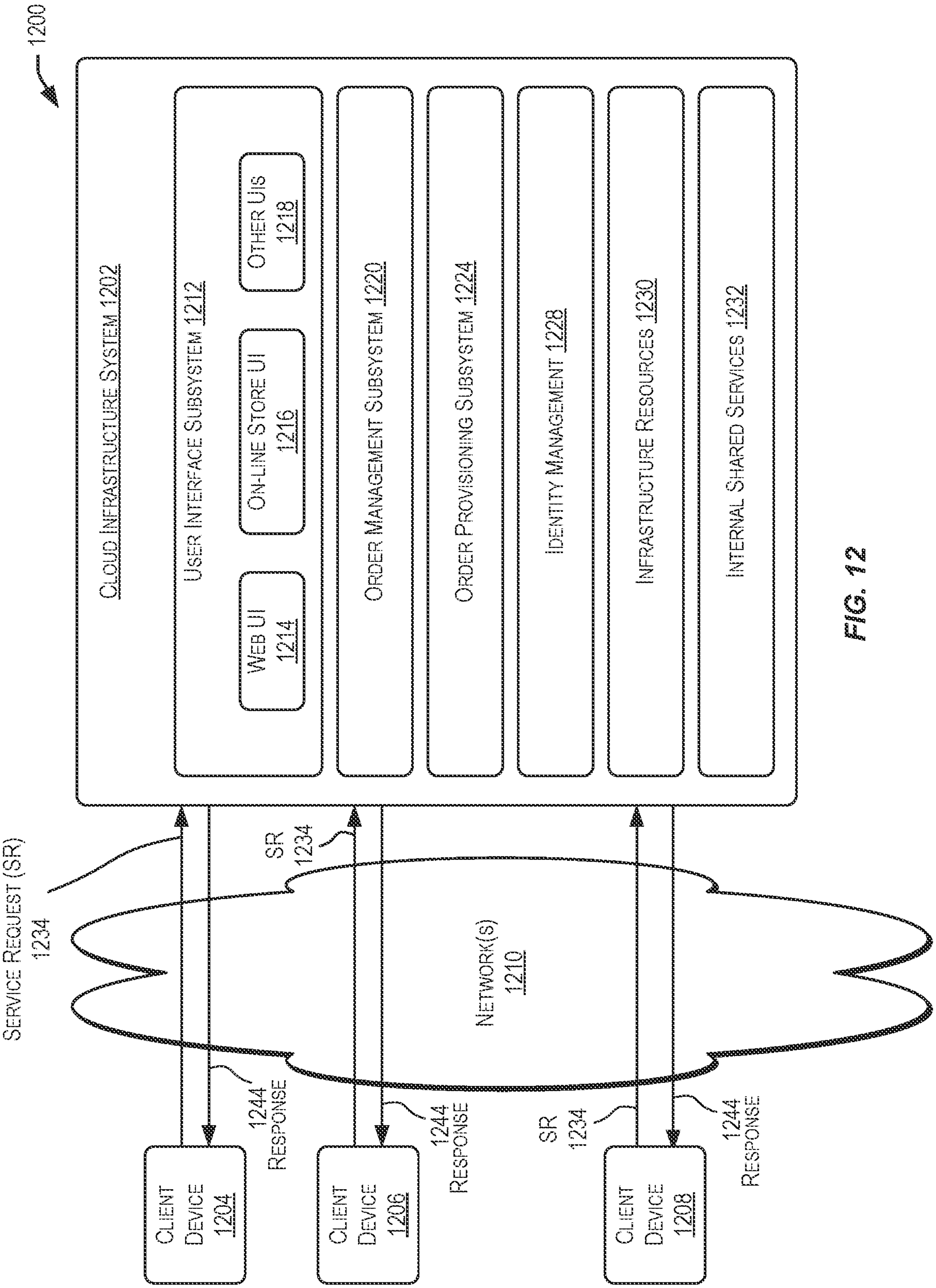
FIG. 12 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 12 is a simplified block diagram of a cloud-based system environment in which various services may be offered as cloud services in accordance with certain examples. In the example depicted in FIG. 12, cloud infrastructure system 1202 may provide one or more cloud services that may be requested by users using one or more client computing devices 1204, 1206, and 1208. Cloud infrastructure system 1202 may comprise one or more computers and/or servers that may include those described above for server 1112. The computers in cloud infrastructure system 1202 may be organized as general purpose computers, specialized server computers, server farms, server clusters, or any other appropriate arrangement and/or combination.

Network(s) 1210 may facilitate communication and exchange of data between clients 1204, 1206, and 1208 and cloud infrastructure system 1202. Network(s) 1210 may include one or more networks. The networks may be of the same or different types. Network(s) 1210 may support one or more communication protocols, including wired and/or wireless protocols, for facilitating the communications.

The example depicted in FIG. 12 is only one example of a cloud infrastructure system and is not intended to be limiting. It should be appreciated that, in some other examples, cloud infrastructure system 1202 may have more or fewer components than those depicted in FIG. 12, may combine two or more components, or may have a different configuration or arrangement of components. For example, although FIG. 12 depicts three client computing devices, any number of client computing devices may be supported in alternative examples.

The term cloud service is generally used to refer to a service that is made available to users on demand and via a communication network such as the Internet by systems (e.g., cloud infrastructure system 1202) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1202 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1202 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1202. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1202. Cloud infrastructure system 1202 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1202 may be configured to provide one or even multiple cloud services.

Cloud infrastructure system 1202 may provide the cloud services via different deployment models. In a public cloud model, cloud infrastructure system 1202 may be owned by a third party cloud services provider and the cloud services are offered to any general public customer, where the customer may be an individual or an enterprise. In certain other examples, under a private cloud model, cloud infrastructure system 1202 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1202 and the services provided may be shared by several organizations in a related community. Various other models such as hybrids of the above mentioned models may also be used.

Client computing devices 1204, 1206, and 1208 may be of different types (such as client computing devices 1102, 1104, 1106, and 1108 depicted in FIG. 11) and may be capable of operating one or more client applications. A user may use a client device to interact with cloud infrastructure system 1202, such as to request a service provided by cloud infrastructure system 1202. For example, a user may use a client device to request information or action from a chatbot as described in this disclosure.

In some examples, the processing performed by cloud infrastructure system 1202 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1202 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 12, cloud infrastructure system 1202 may include infrastructure resources 1230 that are utilized for facilitating the provision of various cloud services offered by cloud infrastructure system 1202. Infrastructure resources 1230 may include, for example, processing resources, storage or memory resources, networking resources, and the like. In certain examples, the storage virtual machines that are available for servicing storage requested from applications may be part of cloud infrastructure system 1202. In other examples, the storage virtual machines may be part of different systems.

In certain examples, to facilitate efficient provisioning of these resources for supporting the various cloud services provided by cloud infrastructure system 1202 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1202 may itself internally use services 1232 that are shared by different components of cloud infrastructure system 1202 and which facilitate the provisioning of services by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1202 may comprise multiple subsystems. These subsystems may be implemented in software, or hardware, or combinations thereof. As depicted in FIG. 12, the subsystems may include a user interface subsystem 1212 that enables users or customers of cloud infrastructure system 1202 to interact with cloud infrastructure system 1202. User interface subsystem 1212 may include various different interfaces such as a web interface 1214, an online store interface 1216 where cloud services provided by cloud infrastructure system 1202 are advertised and are purchasable by a consumer, and other interfaces 1218. For example, a customer may, using a client device, request (service request 1234) one or more services provided by cloud infrastructure system 1202 using one or more of interfaces 1214, 1216, and 1218. For example, a customer may access the online store, browse cloud services offered by cloud infrastructure system 1202, and place a subscription order for one or more services offered by cloud infrastructure system 1202 that the customer wishes to subscribe to. The service request may include information identifying the customer and one or more services that the customer desires to subscribe to. For example, a customer may place a subscription order for a service offered by cloud infrastructure system 1202. As part of the order, the customer may provide information identifying a chatbot system for which the service is to be provided and optionally one or more credentials for the chatbot system.

In certain examples, such as the example depicted in FIG. 12, cloud infrastructure system 1202 may comprise an order management subsystem (OMS) 1220 that is configured to process the new order. As part of this processing, OMS 1220 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1220 may then invoke the order provisioning subsystem (OPS) 1224 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1224 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1202 as part of the provisioning process. Cloud infrastructure system 1202 may generate an application ID and select a storage virtual machine for an application from among storage virtual machines provided by cloud infrastructure system 1202 itself or from storage virtual machines provided by other systems other than cloud infrastructure system 1202.

Cloud infrastructure system 1202 may send a response or notification 1244 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1202 and information identifying a chatbot system selected by cloud infrastructure system 1202 for the chatbot system corresponding to the chatbot system ID.

Cloud infrastructure system 1202 may provide services to multiple customers. For each customer, cloud infrastructure system 1202 is responsible for managing information related to one or more subscription orders received from the customer, maintaining customer data related to the orders, and providing the requested services to the customer. Cloud infrastructure system 1202 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1202 may provide services to multiple customers in parallel. Cloud infrastructure system 1202 may store information for these customers, including possibly proprietary information. In certain examples, cloud infrastructure system 1202 comprises an identity management subsystem (IMS) 1228 that is configured to manage customer information and provide the separation of the managed information such that information related to one customer is not accessible by another customer. IMS 1228 may be configured to provide various security-related services such as identity services, such as information access management, authentication and authorization services, services for managing customer identities and roles and related capabilities, and the like.

Figure 13:
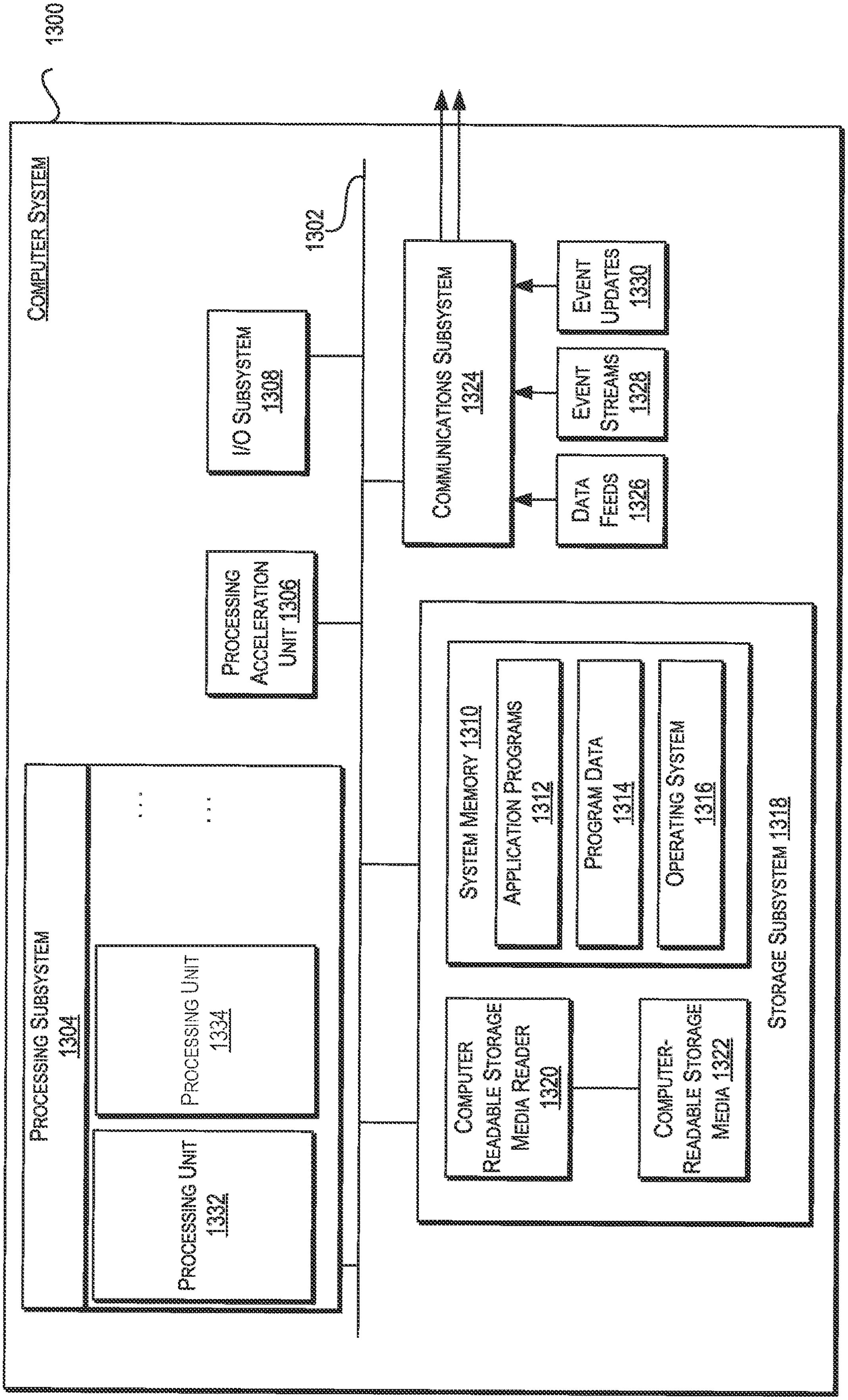
FIG. 13 illustrates an example computer system that may be used to implement various embodiments.

FIG. 13 illustrates an example of computer system 1300. In some examples, computer system 1300 may be used to implement any of the digital assistant or chatbot systems within a distributed environment, and various servers and computer systems described above. As shown in FIG. 13, computer system 1300 includes various subsystems including a processing subsystem 1304 that communicates with a number of other subsystems via a bus subsystem 1302. These other subsystems may include a processing acceleration unit 1306, an I/O subsystem 1308, a storage subsystem 1318, and a communications subsystem 1324. Storage subsystem 1318 may include non-transitory computer-readable storage media including storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative examples of the bus subsystem may utilize multiple buses. Bus subsystem 1302 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1304 controls the operation of computer system 1300 and may comprise one or more processors, application specific integrated circuits (ASICs), or field programmable gate arrays (FPGAs). The processors may include be single core or multicore processors. The processing resources of computer system 1300 may be organized into one or more processing units 1332, 1334, etc. A processing unit may include one or more processors, one or more cores from the same or different processors, a combination of cores and processors, or other combinations of cores and processors. In some examples, processing subsystem 1304 may include one or more special purpose co-processors such as graphics processors, digital signal processors (DSPs), or the like. In some examples, some or all of the processing units of processing subsystem 1304 may be implemented using customized circuits, such as application specific integrated circuits (ASICs), or field programmable gate arrays (FPGAs).

In some examples, the processing units in processing subsystem 1304 may execute instructions stored in system memory 1310 or on computer readable storage media 1322. In various examples, the processing units may execute a variety of programs or code instructions and may maintain multiple concurrently executing programs or processes. At any given time, some or all of the program code to be executed may be resident in system memory 1310 and/or on computer-readable storage media 1322 including potentially on one or more storage devices. Through suitable programming, processing subsystem 1304 may provide various functionalities described above. In instances where computer system 1300 is executing one or more virtual machines, one or more processing units may be allocated to each virtual machine.

In certain examples, a processing acceleration unit 1306 may optionally be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term input device is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1300 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information and data that is used by computer system 1300. Storage subsystem 1318 provides a tangible non-transitory computer-readable storage medium for storing the basic programming and data constructs that provide the functionality of some examples. Storage subsystem 1318 may store software (e.g., programs, code modules, instructions) that when executed by processing subsystem 1304 provides the functionality described above. The software may be executed by one or more processing units of processing subsystem 1304. Storage subsystem 1318 may also provide authentication in accordance with the teachings of this disclosure.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM), dynamic random access memory (DRAM), and the like.

By way of example, and not limitation, as depicted in FIG. 13, system memory 1310 may load application programs 1312 that are being executed, which may include various applications such as Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1322 may store programming and data constructs that provide the functionality of some examples. Computer-readable media 1322 may provide storage of computer-readable instructions, data structures, program modules, and other data for computer system 1300. Software (programs, code modules, instructions) that, when executed by processing subsystem 1304 provides the functionality described above, may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1318 may also include a computer-readable storage media reader 1320 that may further be connected to computer-readable storage media 1322. Reader 1320 may receive and be configured to read data from a memory device such as a disk, a flash drive, etc.

In certain examples, computer system 1300 may support virtualization technologies, including but not limited to virtualization of processing and memory resources. For example, computer system 1300 may provide support for executing one or more virtual machines. In certain examples, computer system 1300 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1300. Accordingly, multiple operating systems may potentially be run concurrently by computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices. For example, when computer system 1300 is used to implement bot system 120 depicted in FIG. 1, the communication subsystem may be used to communicate with a chatbot system selected for an application.

Communication subsystem 1324 may support both wired and/or wireless communication protocols. In certain examples, communications subsystem 1324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1324 may provide wired network connectivity (e.g., Ethernet) in addition to or instead of a wireless interface.

Communication subsystem 1324 may receive and transmit data in various forms. In some examples, in addition to other forms, communications subsystem 1324 may receive input communications in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1324 may be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to communicate data from computer system 1300 to other computer systems or networks. The data may be communicated in various different forms such as structured and/or unstructured data feeds 1326, event streams 1328, event updates 1330, and the like to one or more databases that may be in communication with one or more streaming data source computers coupled to computer system 1300.

Computer system 1300 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1300 depicted in FIG. 13 is intended only as a specific example. Many other configurations having more or fewer components than the system depicted in FIG. 13 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method for fine-tuning a machine learning model comprising plurality of layers, the method comprising:
- identifying an initial set of configurations, each configuration establishing a subset of the plurality of layers to be frozen and a subset of the plurality of layers to be fine-tuned;
- determining a configuration, of the initial set of configurations, that is optimized with respect to one or more parameters, thereby establishing a set of fine-tuning layers of the machine learning model and a set of frozen layers of the machine learning model;
- providing, to a remote system, an input for the machine learning model;
- obtaining, from the remote system, an output of the set of frozen layers of the machine learning model given the provided input;
- locally storing the obtained output of the set of frozen layers;
- loading, from the remote system, the set of fine-tuning layers of the machine learning model; and
- for a plurality of iterations, fine-tuning the set of fine-tuning layers of the machine learning model by:
  - retrieving the locally stored output of the set of frozen layers, and
  - updating weights associated with the set of fine-tuning layers of the machine learning model, thereby generating a customized machine learning model.

2. The method of claim 1, wherein the machine learning model comprises:
- a Pre-trained Language Model (PLM) component;
- a Relation-Aware Transformer (RAT) component; and
- a decoder component configured to generate a database query representation.

3. The method of claim 2, wherein the database query representation is an intermediate database query representation, the method further comprising:
- providing a natural language utterance as input to the customized machine learning model;
- executing the customized machine learning model to generate the intermediate database query representation of the natural language utterance;
- converting the intermediate database query representation of the natural language utterance to a database query in a selected database query language; and executing the database query on a database to retrieve data responsive to the natural language utterance.

4. The method of claim 1, further comprising:

providing a natural language utterance as input to the customized machine learning model;

executing the customized machine learning model to generate a database query representation of the natural language utterance; and executing the database query representation on a database to retrieve data responsive to the natural language utterance.

5. The method of claim 1, wherein:

determining the configuration, of the initial set of configurations, that is optimized with respect to the one or more parameters comprises executing a hypertuning process to optimize an accuracy of the machine learning model.

6. The method of claim 5, wherein the initial set of configurations is a first set of configurations and the hypertuning process is a first hypertuning process, and wherein determining the configuration further comprises:

identifying, based on the first hypertuning process, a candidate configuration;

performing an accuracy evaluation of the machine learning model using the candidate configuration;

determining a second set of configurations based on the accuracy evaluation;

executing a second hypertuning process to optimize the accuracy of the machine learning model based on the second set of configurations; and selecting the configuration, of the initial set of configurations, based on the second hypertuning process.

7. The method of claim 5, wherein the hypertuning process comprises removing configurations that correspond to a training time above a threshold value.

8. A system comprising:

one or more processors; and one or more computer-readable media storing instructions which, when executed by the one or more processors, cause the system to perform operations for fine-tuning a machine learning model comprising plurality of layers, the operations comprising:

identifying an initial set of configurations, each configuration establishing a subset of the plurality of layers to be frozen and a subset of the plurality of layers to be fine-tuned;

determining a configuration, of the initial set of configurations, that is optimized with respect to one or more parameters, thereby establishing a set of fine-tuning layers of the machine learning model and a set of frozen layers of the machine learning model;

providing, to a remote system, an input for the machine learning model;

obtaining, from the remote system, an output of the set of frozen layers of the machine learning model given the provided input;

locally storing the obtained output of the set of frozen layers;

loading, from the remote system, the set of fine-tuning layers of the machine learning model; and for a plurality of iterations, fine-tuning the set of fine-tuning layers of the machine learning model by:

retrieving the locally stored output of the set of frozen layers, and updating weights associated with the set of fine-tuning layers of the machine learning model, thereby generating a customized machine learning model.

9. The system of claim 8, wherein the machine learning model comprises:

a Pre-trained Language Model (PLM) component;

a Relation-Aware Transformer (RAT) component; and a decoder component configured to generate a database query representation.

10. The system of claim 9, wherein the database query representation is an intermediate database query representation, the operations further comprising:

providing a natural language utterance as input to the customized machine learning model;

executing the customized machine learning model to generate the intermediate database query representation of the natural language utterance;

converting the intermediate database query representation of the natural language utterance to a database query in a selected database query language; and executing the database query on a database to retrieve data responsive to the natural language utterance.

11. The system of claim 8, the operations further comprising:

providing a natural language utterance as input to the customized machine learning model;

executing the customized machine learning model to generate a database query representation of the natural language utterance; and executing the database query representation on a database to retrieve data responsive to the natural language utterance.

12. The system of claim 8, wherein:

determining the configuration, of the initial set of configurations, that is optimized with respect to the one or more parameters comprises executing a hypertuning process to optimize an accuracy of the machine learning model.

13. The system of claim 12, wherein the initial set of configurations is a first set of configurations and the hypertuning process is a first hypertuning process, and wherein determining the configuration further comprises:

identifying, based on the first hypertuning process, a candidate configuration;

performing an accuracy evaluation of the machine learning model using the candidate configuration;

determining a second set of configurations based on the accuracy evaluation;

executing a second hypertuning process to optimize the accuracy of the machine learning model based on the second set of configurations; and selecting the configuration, of the initial set of configurations, based on the second hypertuning process.

14. The system of claim 12, the operations further comprising:

wherein the hypertuning process comprises removing configurations that correspond to a training time above a threshold value.

15. One or more non-transitory computer-readable media storing instructions for fine-tuning a machine learning model comprising plurality of layers which, when executed by one or more processors, cause a system to perform operations comprising:

identifying an initial set of configurations, each configuration establishing a subset of the plurality of layers to be frozen and a subset of the plurality of layers to be fine-tuned;

determining a configuration, of the initial set of configurations, that is optimized with respect to one or more parameters, thereby establishing a set of fine-tuning layers of the machine learning model and a set of frozen layers of the machine learning model;

providing, to a remote system, an input for the machine learning model;

obtaining, from the remote system, an output of the set of frozen layers of the machine learning model given the provided input;

locally storing the obtained output of the set of frozen layers;

loading, from the remote system, the set of fine-tuning layers of the machine learning model; and for a plurality of iterations, fine-tuning the set of fine-tuning layers of the machine learning model by:

retrieving the locally stored output of the set of frozen layers, and updating weights associated with the set of fine-tuning layers of the machine learning model, thereby generating a customized machine learning model.

16. The one or more non-transitory computer-readable media of claim 15, wherein the machine learning model comprises:

a Pre-trained Language Model (PLM) component;

a Relation-Aware Transformer (RAT) component; and a decoder component configured to generate a database query representation.

17. The one or more non-transitory computer-readable media of claim 16, wherein the database query representation is an intermediate database query representation, the operations further comprising:

providing a natural language utterance as input to the customized machine learning model;

executing the customized machine learning model to generate the intermediate database query representation of the natural language utterance;

converting the intermediate database query representation of the natural language utterance to a database query in a selected database query language; and executing the database query on a database to retrieve data responsive to the natural language utterance.

18. The one or more non-transitory computer-readable media of claim 15, wherein:

determining the configuration, of the initial set of configurations, that is optimized with respect to the one or more parameters comprises executing a hypertuning process to optimize an accuracy of the machine learning model.

19. The one or more non-transitory computer-readable media of claim 18, wherein the initial set of configurations is a first set of configurations and the hypertuning process is a first hypertuning process, and wherein determining the configuration further comprises:

identifying, based on the first hypertuning process, a candidate configuration;

performing an accuracy evaluation of the machine learning model using the candidate configuration;

determining a second set of configurations based on the accuracy evaluation;

executing a second hypertuning process to optimize the accuracy of the machine learning model based on the second set of configurations; and selecting the configuration, of the initial set of configurations, based on the second hypertuning process.

20. The one or more non-transitory computer-readable media of claim 18, wherein the hypertuning process comprises removing configurations that correspond to a training time above a threshold value.

* * * * *